(12) United States Patent
Ryoo et al.

(10) Patent No.: US 11,071,018 B2
(45) Date of Patent: Jul. 20, 2021

(54) METHOD AND DEVICE FOR CONFIGURING CELL IN WIRELESS COMMUNICATION SYSTEM

(71) Applicant: Samsung Electronics Co., Ltd., Suwon-si (KR)

(72) Inventors: Sunheui Ryoo, Yongin-si (KR); Seunghoon Park, Seoul (KR); Jungsoo Jung, Suwon-si (KR); Jungmin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/188,179

(22) Filed: Nov. 12, 2018

(65) Prior Publication Data

US 2019/0082355 A1  Mar. 14, 2019

Related U.S. Application Data

(63) Continuation of application No. 15/518,231, filed as application No. PCT/KR2015/010689 on Oct. 8, 2015, now Pat. No. 10,129,793.

(Continued)

(51) Int. Cl.
*H04W 28/18* (2009.01)
*H04W 76/20* (2018.01)
(Continued)

(52) U.S. Cl.
CPC .......... *H04W 28/18* (2013.01); *H04W 24/02* (2013.01); *H04W 24/08* (2013.01); *H04W 28/16* (2013.01);
(Continued)

(58) Field of Classification Search
CPC .......... H04L 27/2601; H04W 72/1289; H04W 52/0206
(Continued)

(56) References Cited

U.S. PATENT DOCUMENTS 9,763,151 B2   9/2017 Kim
2005/0272424 A1   12/2005 Gallagher et al.
(Continued)

FOREIGN PATENT DOCUMENTS

CN   103460740 A   12/2013
KR   20140062502 A   5/2014
(Continued)

OTHER PUBLICATIONS

European Patent Office, European Patent Application No. 15849270. 2, Extended European Search Report and European Search Opinion dated Jun. 26, 2017, 9 pages.
(Continued)

*Primary Examiner* — Kiet M Doan

(57) ABSTRACT

The present invention relates to a method and a device for selecting a cell in a mobile communication system and, more particularly, to a method and a device for selecting a cell for transmitting data, by a base station, not only in a licensed frequency band but in an unlicensed frequency band. In order to achieve the described task, a method for configuring a cell of a base station in a mobile communication system according to an embodiment of the present invention comprises the steps of: connecting with a terminal through a first cell of a licensed band; transmitting, to the terminal, a message for configuring multiple second cells in an unlicensed band through the first cell; and monitoring the configured multiple second cells in the unlicensed band, wherein the number of the multiple second cells exceeds the number of cells, a Carrier Aggregation (CA) of which the
(Continued)

terminal can support. The present disclosure relates to a 5G or a pre-5G communication system to be provided in order to support a higher data transmission rate after a 4G communication system such as an LTE.

12 Claims, 36 Drawing Sheets

Related U.S. Application Data

(60) Provisional application No. 62/062,446, filed on Oct. 10, 2014.

(51) Int. Cl.

| | | |
|---|---|---|
| *H04W 24/08* | (2009.01) | |
| *H04W 72/02* | (2009.01) | |
| *H04W 74/08* | (2009.01) | |
| *H04W 88/02* | (2009.01) | |
| *H04W 88/08* | (2009.01) | |
| *H04W 24/02* | (2009.01) | |
| *H04W 28/16* | (2009.01) | |
| *H04B 7/06* | (2006.01) | |
| *H04W 8/02* | (2009.01) | |
| *H04W 88/12* | (2009.01) | |

(52) U.S. Cl.
CPC ........... *H04W 72/02* (2013.01); *H04W 74/08* (2013.01); *H04W 76/20* (2018.02); *H04W 88/02* (2013.01); *H04W 88/08* (2013.01); *H04W 88/085* (2013.01); *H04B 7/0686* (2013.01); *H04W 8/02* (2013.01); *H04W 88/12* (2013.01)

(58) Field of Classification Search
USPC ........ 455/452.1, 41.2, 434, 424, 436, 552.1, 455/435.1; 370/329, 241.1, 342, 312, 370/328, 280, 252, 348, 320, 468, 336, 370/315, 216
See application file for complete search history.

(56) References Cited

U.S. PATENT DOCUMENTS

| | | |
|---|---|---|
| 2010/0124331 A1 | 5/2010 | Park et al. |
| 2012/0115420 A1* | 5/2012 | Trainin ................. H04W 16/14 455/41.2 |
| 2012/0250631 A1 | 10/2012 | Hakola et al. |
| 2012/0257601 A1 | 10/2012 | Kim et al. |
| 2013/0002960 A1 | 1/2013 | Ryu et al. |
| 2013/0195036 A1* | 8/2013 | Quan .................... H04W 72/04 370/329 |
| 2013/0337821 A1 | 12/2013 | Clegg |
| 2014/0010086 A1 | 1/2014 | Etemad et al. |
| 2014/0050113 A1 | 2/2014 | Rosa et al. |
| 2014/0056243 A1 | 2/2014 | Pelletier et al. |
| 2014/0161002 A1 | 6/2014 | Gauvreau et al. |
| 2014/0211686 A1 | 7/2014 | Cariou et al. |
| 2014/0254452 A1* | 9/2014 | Golitschek Edler Von Elbwart ................ H04W 28/20 370/311 |
| 2014/0295909 A1* | 10/2014 | Ouchi ................. H04W 52/242 455/522 |
| 2015/0003425 A1* | 1/2015 | Kim ..................... H04W 72/042 370/336 |
| 2015/0063151 A1 | 3/2015 | Sadek et al. |
| 2015/0181624 A1* | 6/2015 | Hwang ................. H04L 5/0053 370/329 |
| 2015/0189627 A1 | 7/2015 | Yang et al. |
| 2015/0249972 A1* | 9/2015 | You ......................... H04L 5/001 370/254 |
| 2016/0014626 A1* | 1/2016 | Yl ......................... H04W 76/10 370/252 |
| 2016/0088537 A1* | 3/2016 | Uchino ............. H04W 36/0055 370/331 |
| 2016/0212645 A1* | 7/2016 | Uemura ................. H04W 24/08 |

FOREIGN PATENT DOCUMENTS

| | | |
|---|---|---|
| WO | 2012134567 A1 | 10/2012 |
| WO | 2013023354 A1 | 2/2013 |
| WO | 2014007593 A1 | 1/2014 |

OTHER PUBLICATIONS

European Patent Office, "Communication pursuant to Article 94(3) EPC," Application No. 15849270.2, dated Oct. 1, 2018, 5 pages.
Alcatel-Lucent, "Channel Selection for Licensed-Assisted Access," R1-144082, 3GPP TSG RAN WG1 Meeting #78bis, Ljubljana, Slovenia, Oct. 6-10, 2014, 6 pages.
LG Electronics, "Deployment scenarios for LAA," R1-144043, 3GPP TSG RAN, WG1 Meeting #78bis, Ljubljana, Slovenia, Oct. 6-10, 2014, 8 pages.
Nokia, "Motivation for New SI Proposal: LTE Carver Aggregation Enhancement Beyond 5 Carriers," RP-141417, 3GPP TSG RAN Meeting #65; Edinburg, United Kingdom, Sep. 9-12, 2014, 3 pages.
Nokia, "New SI Proposal: LTE Carrier Aggregation Enhancement Beyond 5 Carriers," RP-141418, 3GPP TSG RAN Meeting #65, Edinburg, United Kingdom, Sep. 9-12, 2014, 6 pages.
Samsung, "Deployment scenarios and evaluation methodologies for LAA," R1-143880, 3GPP TSG RAN WG1 #78bis, Ljubljana, Slovenia, Oct. 6-10, 2014, 7 pages.
China National Intellectual Property Administration, "The First Office Action," Application No. CN201580060761.9, dated Sep. 2, 2019, 29 pages.
Partial European Search Report dated Jun. 9, 2020 in connection with European Patent Application No. 20 16 0677, 15 pages.

\* cited by examiner

METHOD AND DEVICE FOR CONFIGURING CELL IN WIRELESS COMMUNICATION SYSTEM

CROSS REFERENCE TO RELATED APPLICATIONS

This application is a continuation of application Ser. No. 15/518,231, which is the National Stage of International Application No. PCT/KR2015/010689, filed Oct. 8, 2015, which claims the benefit of Provisional Application No. 62/062,446, filed Oct. 10, 2014 this disclosures of which are herein incorporated by reference in their entirety.

BACKGROUND

1. Field

The present invention relates to a method and a device for selecting a cell in a mobile communication system, and more particularly, to a method and a device for selecting a cell, which enable a base station to transmit data not only in a licensed frequency band but also in an unlicensed frequency band.

2. Description of Related Art

In order to meet the wireless data traffic demand that is on an increasing trend after commercialization of 4G communication system, efforts for developing improved 5G communication system or pre-5G communication system have been made. For this reason, the 5G communication system or pre-5G communication system has been called beyond 4G network communication system or post LIE system.

In order to achieve high data rate, implementation of 5G communication system in a millimeter Wave (mmWave) band (e.g., like 60 GHz band) has been considered. In order to mitigate a radio wave path loss and to increase a radio wave transmission distance in the mmWave band, technologies of beam-forming, massive MIMO, Full Dimension MIMO (FD-MIMO), analog beam-forming, and large scale antenna for the 5G communication system have been discussed.

Further, for system network improvement in the 5G communication system, technology developments have been made for an evolved small call, advanced small cell, cloud Radio Access Network (cloud RAN), ultra-dense network, Device to Device communication (D2D), wireless backhaul, moving network, cooperative communication, Coordinated Multi-Points (CoMP), and reception interference cancellation.

In addition, Hybrid FSK and QAM Modulation (FQAM) and Sliding Window Superposition Coding (SWSC), which correspond to Advanced Coding Modulation (ACM) system, and Filter Bank Multi Carrier (FBMC), Non-Orthogonal Multiple Access (NOMA), and Sparse Code Multiple Access (SCMA), which correspond to advanced connection technology, have been developed in the 5G system.

In general, a mobile communication system was developed for the purpose of providing a voice service while securing user's mobility. However, the area of the mobile communication system has been expanded gradually to data services in addition to voice services, and, at present, the mobile communication system has been developed to the extent of being capable of providing high-speed data services. However, in the mobile communication system that is currently providing a high-speed data service, since resources are short, there has been a need for a greatly developed mobile communication system.

On the other hand, unlike a voice service, resources that can be allocated for a data service are determined in accordance with the amount of data to be transmitted and a channel situation. Accordingly, in a wireless communication system, such as a mobile communication system, a scheduler manages allocation of transmission resources in consideration of the amount of resources to be transmitted, the channel situation, and the amount of data. Such management is performed in the same manner even in a Long-Term Evolution (LTE) that is one of the next-generation mobile communication systems, and in this case, the scheduler that is located in a base station manages and allocates wireless transmission resources.

Since an LTE communication system is a system that uses licensed frequencies, it can exclusively use frequency resources through a method that is desired by an owner. However, in the case of unlicensed frequencies, several communication devices can non-exclusively share and use frequency resources. The frequency resources that are allocated to communication service providers are limitative, and in spite of the development of high technology in accordance with an abrupt increase of traffic, medium/long-term frequency demands from the communication service providers have been increased. In addition, since the frequency demand scale in the fields of broadcasting, public, and misfortune services excluding communications is on an increasing trend, it gets difficult to flexibly cope with the demand-supply relations of such various frequency resources through an exclusive frequency distribution method based on the licensing method. Accordingly, even in the L communication system, LTE-Unlicensed (LTE-U) technology has been developed to provide services using unlicensed frequencies. Accordingly, there is a need for discussion of cell selection and switching methods through a base station in the non-licensed frequency band.

However, since the existing cell selection and switching methods in the non-licensed band are performed on the basis of long-term channel measurement information that corresponds to several seconds or several hours, a relatively long delay occurs in changes. Further, channel occupation becomes unreliable due to the unlicensed band characteristics with respect to a corresponding frequency channel after the channel change. Since various Radio Access Technologies (RAT), such as WiFi and LIE-U, competitively occupy the channel resources in the corresponding unlicensed band and use separate communication protocols and control signaling, there exist limitations in sharing information about channel occupation or interference situations of neighboring links.

Accordingly, in the case where a user terminal uses only determined unlicensed band channels, channel occupation according to peripheral transmission is limited. Accordingly, User Perspective Throughput (UPT) is deteriorated, and transmission delay is increased to cause limitations in performance.

SUMMARY

The present invention has been made in order to solve the above problems, and an aspect of the present invention proposes a method and a device for supporting activated cell switching of a terminal in a short time unit (several ms) in order to solve the problem of deterioration of a shared channel occupation that corresponds to an unlicensed band in a network in which a Licensed-Assisted Access (LAA)

system that operates by means of a cellular communication protocol including LTE in the unlicensed band, a communication system that operates by means of another communication protocol including WiFi, and a cellular communication network that operates in a licensed band coexist.

In one aspect of the present invention, a method for configuring a cell of a base station in a mobile communication system includes connecting with a terminal through a first cell in a licensed band; transmitting a message for configuring a plurality of second cells in an unlicensed band to the terminal through the first cell; and monitoring the plurality of the configured second cells in the unlicensed band, wherein the number of the second cells exceeds the number of cells that can support Carrier Aggregation (CA) of the terminal.

In another aspect of the present invention, a method for configuring a cell of a terminal in a mobile communication system includes connecting with a base station through a first cell in a licensed band; receiving a message for configuring a plurality of second cells in an unlicensed band from the base station through the first cell; and configuring the plurality of second cells in the unlicensed band, wherein the number of the second cells exceeds the number of cells that can support Carrier Aggregation (CA) of the terminal.

In still another aspect of the present invention, a base station for configuring a cell in a mobile communication system includes a transceiver unit configured to transmit and receive signals in frequencies of a licensed band and an unlicensed band; and a control unit configured to connect with a terminal through a first cell in the licensed band, to transmit a message for configuring a plurality of second cells in an unlicensed band to the terminal through the first cell, and to monitor the plurality of the configured second cells in the unlicensed band, wherein the number of the second cells exceeds the number of cells that can support Carrier Aggregation (CA) of the terminal.

In yet still another aspect of the present invention, a terminal for configuring a cell in a mobile communication system includes a transceiver unit configured to transmit and receive signals in frequencies of a licensed band and an unlicensed band; and a control unit configured to connect with a base station through a first cell in the licensed band, to receive a message for configuring a plurality of second cells in the unlicensed band from the base station through the first cell, and to configure the plurality of second cells in the unlicensed band, wherein the number of the second cells exceeds the number of cells that can support Carrier Aggregation (CA) of the terminal.

In accordance with embodiments of the present invention, a plurality of cells in a licensed frequency band and in an unlicensed frequency band are pre-configured with respect to a terminal, and a base station selects the best cell for the terminal through monitoring of cell occupation situations and the like, and transmits a cell switching message to the terminal in a short time unit. Accordingly, coexistence with other communication devices in the unlicensed frequencies can be sought, and the performance of the communication system can be improved.

DETAILED DESCRIPTION

Figure 1:
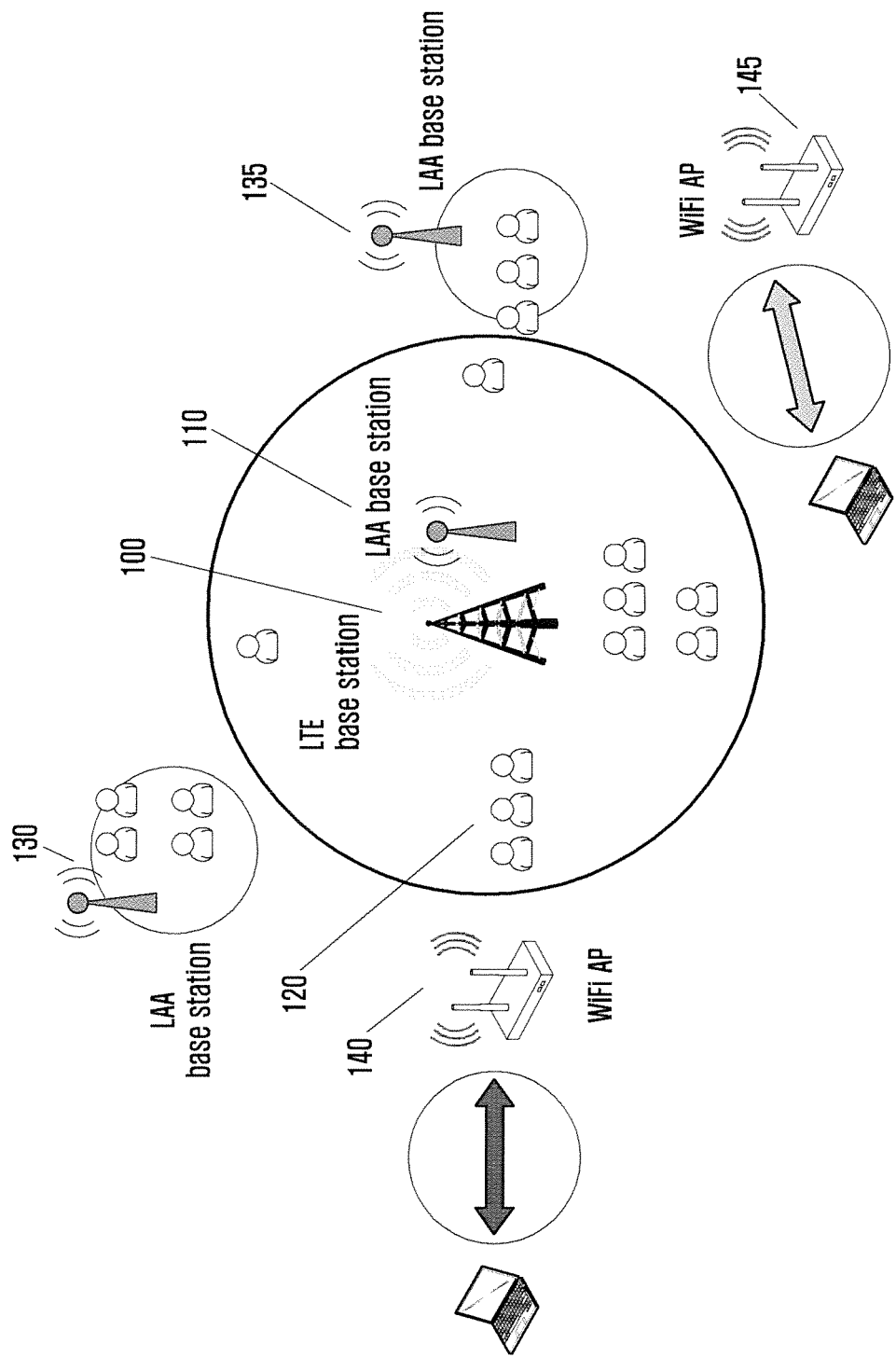
FIG. 1 is a diagram illustrating a network environment in which LAA base stations that operate in an unlicensed band, WiFi Access Points (APs), and LTE base stations that operate in a licensed band coexist.

Hereinafter, embodiments of the present invention will be described in detail with reference to the accompanying drawings.

In describing the embodiments of the present invention, explanation of the technical contents that are well known in the art to which the present invention pertains and are not directly related to the present invention will be omitted to avoid obscuring the subject matter of the present invention and to transfer the same more accurately.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described herein with reference to the accompanying drawings illustrating block diagrams and flowcharts according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in an embodiment, means, but is not limited to, a software or hardware component, such as FPGA or ASIC, which performs certain tasks. However, a unit does not mean that it is limited to software or hardware. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, components and units may be implemented to reproduce one or more CPUs in a device or a security multimedia card.

For reference, the terms "Channel (CH)", "cell (i.e., primary cell, secondary cell, or candidate cell)", "carrier", and "component carrier", as used in the present invention, designate frequency bandwidths that operate in one unit during wireless communication transmission, and may be defined by the frequency bandwidths in the center frequency. The above-described terms may be mixedly used.

Further, the term "cell switch", as used in the present invention, designates an operation of selecting at least one of a plurality of cells that are pre-configured to a terminal through a Radio Resource Control (RRC) message and changing the selected cell to an activated cell. Such activation includes reception of data, an operation for RRM or CSI measurement, and an operation for monitoring of a corresponding cell (for future data reception) in all.

FIG. 1 is a diagram illustrating a network environment in which LAA base stations that operate in an unlicensed band, WiFi Access Points (APs), and LTE base stations that operate in a licensed band coexist.

More specifically, in a network environment, there exist an LTE base station 100 that operates through exclusive occupation of frequency channels in a licensed band, LAA base stations 110, 130, and 135 that non-exclusively operate in an unlicensed band, and WiFi Access Points (APs) 140 and 145. Further, there exist a plurality of user terminals 120 that receive services from the base stations or the WiFi APs.

The LAA base station 100 is a base station that performs communication using an LTE communication method in an unlicensed band. The LAA base station 100 may be called an LIE on Unlicensed spectrum (LTE-U) that corresponds to an LIE technology in an unlicensed band through reflection of the above-described features. In the description of the present invention, the term "LTE-U base station" may be mixedly used.

On the other hand, in the unlicensed band, transmission outputs of base stations are mostly restricted, and in order to observe the regulations that are set to minimize interference with communication devices of other service providers, the environment is unable to guarantee the service of an equivalent level in a specific area. In order to solve this problem, a Carrier Aggregation (CA) method that is mixed with an LTE communication method in a licensed band may be used. That is, the LTE base station 100 and the Licensed-Assisted Access (LAA) base station 110 can cooperate with each other to perform a CA operation. In this case, the LTE base station 110 and the LAA base station 110 may be base stations that are physically separated from each other, but a single base station can be configured to perform both functions of the LIE base station 100 and the LAA base station 110.

Figure 2:
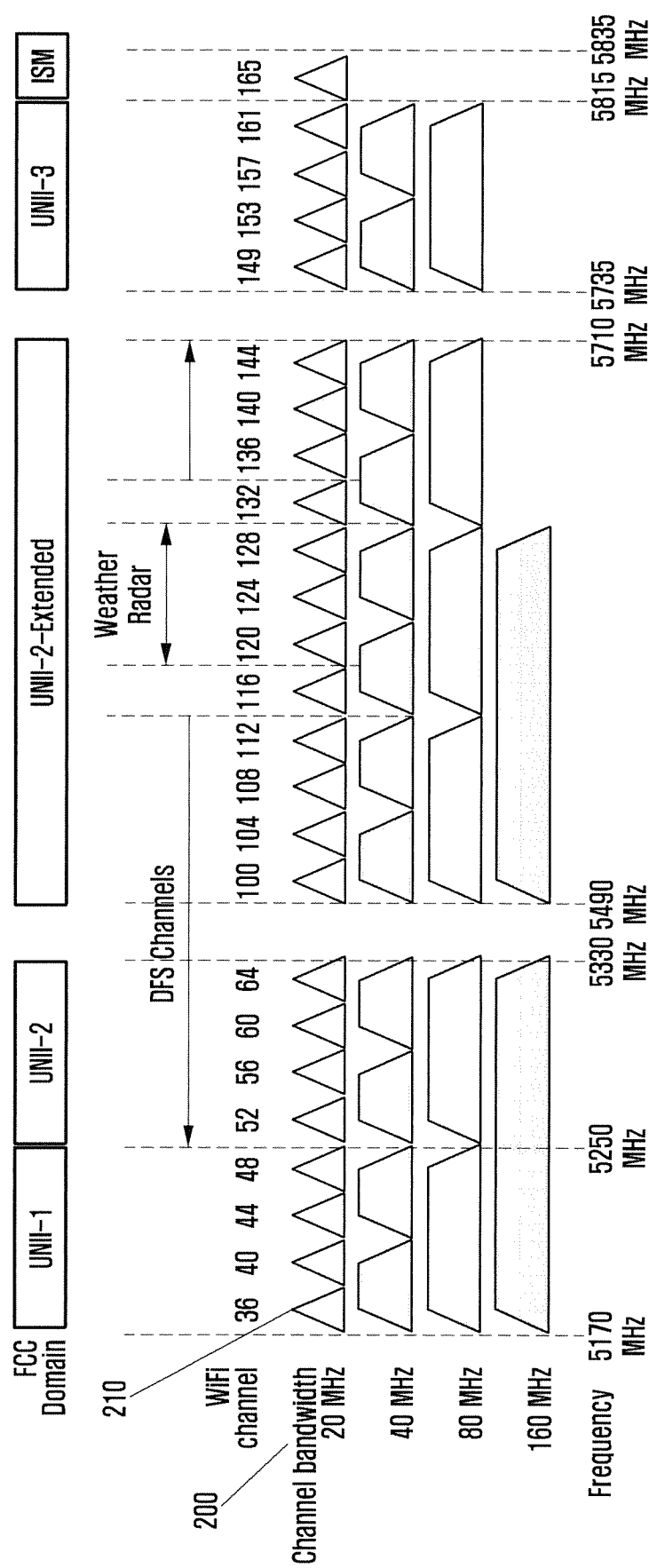
FIG. 2 is a diagram explaining an unlicensed frequency channel.

FIG. 2 is a diagram explaining an unlicensed frequency channel.

At present, in many countries, the bandwidth of about 500 MHz is allocated for unlicensed uses in the unlicensed band of 5 GHz. Referring to FIG. 2, 25 carriers 210, each of which has a bandwidth 200 of 20 MHz, constitute the bandwidth of 500 MHz in total. At present, it is considered that the LTE communication system can perform the CA operation maximally up to 5 carriers, that is, up to 100 MHz, in the licensed band, and in the case of performing the CA operation through inclusion of even the unlicensed band, frequency resources of a wider band can be used.

Figure 3:
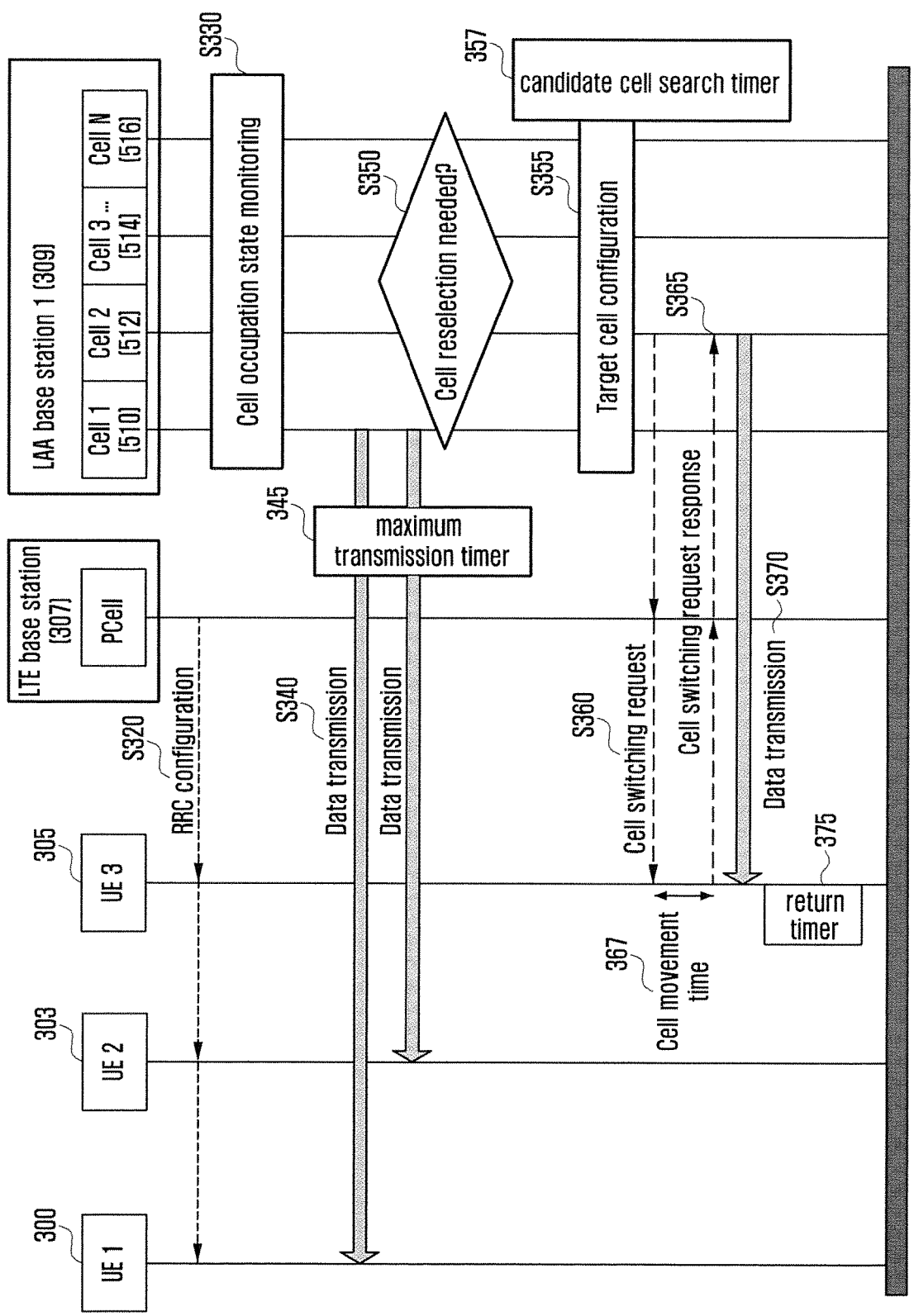
FIG. 3 is a diagram explaining a cell switching method in an unlicensed band according to an embodiment of the present invention.

FIG. 3 is a diagram explaining a cell switching method in an unlicensed band according to an embodiment of the present invention.

The present invention proposes a cell switching method for changing a channel through selection of at least one of a plurality of cells 310, 312, 314, and 316 of an LAA base station 309 in the case where the LAA base station 309 determines that the transmission is not possible in a cell in which the terminal is currently activated to operate, that is, in a home cell that is determined as the best cell for the terminal through average channel measurement. In order to discriminate between a Primary cell (Nell) of the LIE base station that operates in the licensed band and a plurality of Secondary cells (Scells) of the LAA base station 309 that operates in the unlicensed band as shown in FIG. 3, the P cell may be called a first cell, and the plurality of S cells may be called second cells. Further, although the LIE base station 307 and the LAA base station 309 are discriminately illustrated in FIG. 3, it may be exemplified that the LTE base station 307 and the LAA base station 309, which are physically separated, are connected to each other to operate together, or a physically single base station is provided with an LTE communication module and an LAA communication module to operate.

First, the LTE base station 307 may transmit a cell configuration message that includes information on a plurality of cells for the cell configuration to each terminal (S320). That is, the Primary cell (Pcell) of the LTE base station 307 has already been connected to terminal 1 300, terminal 2 303, and terminal 3 305, and thus can transmit the cell configuration message. As described above, in order to perform the channel switching operation according to the present invention, the terminals 300, 303, and 305, during an initial configuration with the LAA base station 309, configure the plurality of cells 310, 312, 314, and 316 that operate in the LAA base station 309 in addition to reception of channel information of the Primary cell (Pcell) and the Secondary cells (Scells) when performing the CA operation in accordance with Radio Frequency (RF) capability limitations of the terminals in the related art. In this case, the LTE base station may transmit information for configuring the cell 1 310 as the currently activated cell and configuring the remaining cell 2 312, cell 3 314, and cell 4 316 as candidate cells. The candidate cells are cells which are not currently activated, but are configured to the terminals through the RRC message, and thus have possibility of becoming target cells for cell switching of the terminals. It is assumed that terminal 1 300, terminal 2 303, and terminal 3 305 are all related to the LAA base station through the RRC configuration message, and cell 1 310 is configured as the currently activated cell.

Thereafter, the LAA base station 309 may monitor the occupation states of the plurality of cells 310, 312, 314, and 316 (S330). In the case of a transmission mode, the LAA base station may perform monitoring using scheduling information of the LAA base station. Further, in the case of a non-transmission mode, the LAA base station may monitor the transmission state of another WiFi device or LAA base station. Thereafter, the LAA base station may transmit data to terminals 1, 2, and 3 300, 303, and 305 through cell 1 310 that is configured and activated as a source cell (S340). In this case, the LAA base station may perform data transmission for a predetermined time through selective execution of a maximum transmission timer.

Thereafter, the LAA base station 309 may determine whether cell reselection is needed in a specific terminal (S300). That is, the LAA base station may sense whether the cell reselection is needed. If the cell reselection is needed at operation S300, the LAA base station 309 may configure a target cell with respect to terminal 3 305 (S355). Even at this time, in the same manner as monitoring the cell occupation state at operation S330, the LAA base station may use the scheduling information of itself in the transmission mode, and may search for a target cell based on the transmission state of another WiFi device or LAA base station in the unlicensed mode. The details thereof will be described later. In this case, the LAA base station may search for the target cell within a predetermined time through selective operation of a candidate cell search timer 357, and if the target cell is not searched for until the predetermined time elapses, the LAA base station may return to cell 1 310 that is a home cell.

If it is assumed that cell 2 312 is selected as the target cell, cell 2 312 in the LAA base station 309 may transmit a cell switching request message to terminal 3 305 (S360). If cell movement is completed after a cell movement time 368 elapses, the terminal may transmit a response message against the cell switching request to cell 2 312 (S365). Cell 2 312 that has received the response message may transmit data to terminal 3 305 (S370). Thereafter, the base station may explicitly control the terminal through L1 signaling to deactivate the corresponding cell. Further, the base station may control terminal 3 305 to selectively operate a return timer 375, and if the predetermined time elapses, it may return to cell 1 310 that is a home cell.

Figure 4:
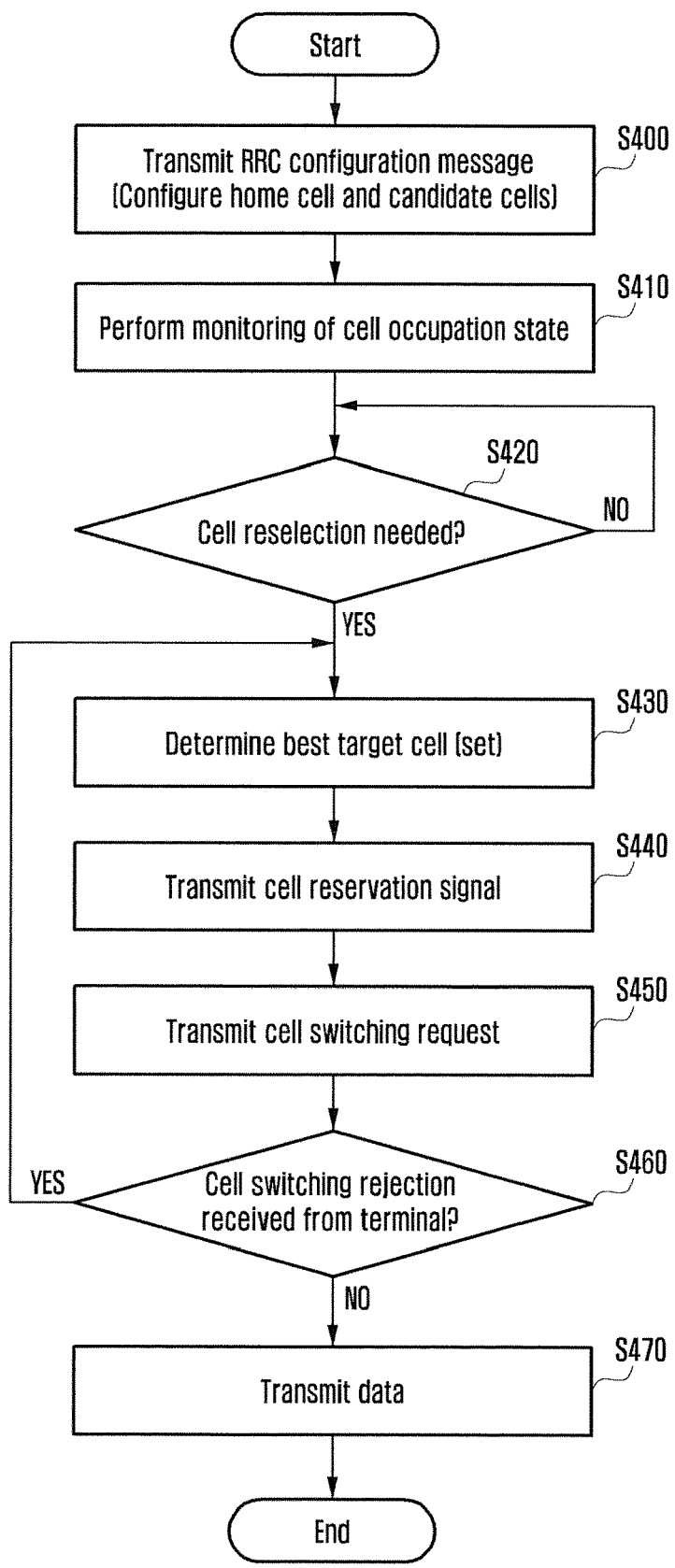
FIG. 4 is a diagram explaining an operation of an LAA base station for dynamic cell selection in an unlicensed band according to an embodiment of the present invention.

FIG. 4 is a diagram explaining an operation of an LAA base station for dynamic cell selection in an unlicensed band according to an embodiment of the present invention.

More specifically, FIG. 4 is a diagram materializing the operation of an LAA base station 309 of FIG. 3.

The LTE base station or the LAA base station may transmit an RRC configuration message to each terminal (S400). That is, the LTE or LAA base station may transmit a cell configuration message that includes information on a home cell for the terminal and candidate cells. The home cell may be the best cell for each terminal that is determined in accordance with the long-term average measurement result for a neighboring network environment through the LAA base station. Thereafter, the LAA base station may monitor the occupation states of a plurality of cells in the LAA base station (S410). The LAA base station may determine whether cell reselection is needed with respect to the terminal (S420). If the cell reselection is needed, the LAA base station may select the best target cell for the terminal (S430). In this case, the LAA base station may select not only one target cell but also a plurality of target cells. Thereafter, the LAA base station may perform a cell reservation operation with respect to the determined target cell (S440). That is, the LAA base station may transmit a cell reservation signal to the target cell so as to prevent other communication devices from occupying the cell until scheduling of the target cell is performed. The LAA base station may transmit a cell switching request message to the terminal (S450). If a cell switching rejection message is received from the terminal, the LAA base station may return to the operation S430 to determine the best target cell for the terminal, and then performs the subsequent operation in the same manner. Further, if a cell switching request response message to the cell switching request message is received from the terminal, the LAA base station may transmit data (S470).

Figure 5:
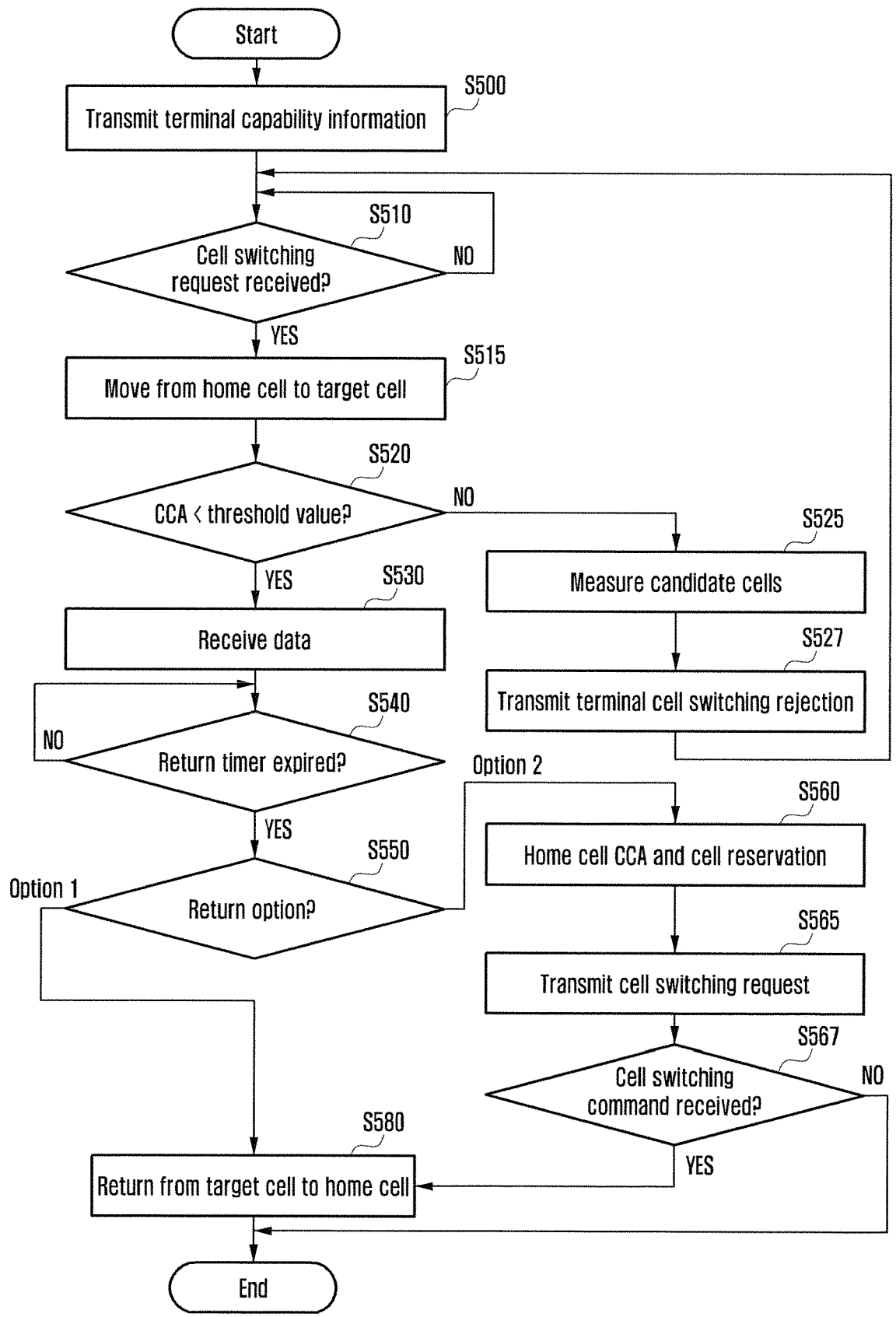
FIG. 5 is a diagram explaining an operation of a terminal for dynamic cell selection in an unlicensed band according to an embodiment of the present invention.

FIG. 5 is a diagram explaining an operation of a terminal for dynamic cell selection in an unlicensed band according to an embodiment of the present invention.

More specifically, FIG. 5 is a diagram explaining detailed operations of the terminals 300, 303, and 305 of FIG. 3. The terminal may transmit Radio Frequency (RF) capability information (S500). The RF capability information may include information about the number of cells that can be aggregated in the case where the terminal in the related art performs the CA operation in the LTE communication system. The terminal may receive the RRC configuration message from the base station (S550). The terminal may receive the cell configuration message that includes information about a home cell for the terminal and candidate cells.

Thereafter, the terminal may determine whether the cell switching request is received from the LAA base station (S510). If the cell switching request is received, the terminal may move from the home cell to the target cell (S515). Thereafter, the terminal may perform Clear Channel Assessment (CCAQ) to determine whether a signal in the target cell is equal to or smaller than a threshold value. If the CCA is equal to or larger than the threshold value, the terminal can measure the candidate cells that are configured at operation S505 (S525). Thereafter, the terminal may transmit the cell switching rejection message to the LAA base station (S527), and may again determine whether the cell switching request message is received from the LAA base station (S510).

If the CCA is smaller than the threshold value at operation S520, the terminal may transmit the cell switching request response message to the target cell, and may receive the data (S530). After completion of the data transmission/reception, the base station may explicitly control the terminal through L1 signaling to deactivate the corresponding cell. Further, the terminal may determine deactivation of the corresponding cell based on whether a predetermined return timer expires in order to selectively determine whether to return to the previous home cell (S540). Further, the terminal may move from the corresponding target cell to the home cell. Here, the home cell means a cell in which an average measurement value that is determined on the basis of interference, channel load, and cell accessibility is the best with respect to the terminal. If the return time expires, the terminal may determine what return option has been configured (S550). The return option may include option 1 that is based on the return timer and option 2 that is based on the cell monitoring.

More specifically, the return option 1 is to unconditionally return to the home cell when the timer expires (S580). The return option 2 is to return to the home cell only in the case of transmitting the request message with respect to the home cell and performing a command for permitting the corresponding cell switching. First, if the result of the CCA that is performed in the home cell is smaller than the threshold value, the home cell can be pre-reserved (S560). Thereafter, the terminal may transmit the cell switching request to the home cell (S565), and if the cell switching request is received from the home cell (S567), the terminal may perform returning from the target cell to the home cell (S580).

Frequent movement of the terminal to the target cell may cause a movement overhead, and if frequent return to the home cell is indicated through PDCCH, it may cause lack of PDCCH resources. However, on the basis of a long-term cell, the home cell has a better performance, and thus returning of the terminal to the home cell may cause a tradeoff between the movement overhead and performance gain.

Hereinafter, individual processes of the method according to the present invention as described above with reference to FIGS. 3, 4, and 5 will be described. FIGS. 6 to 11 are diagrams that are related to a process of transmitting an RRC configuration message for an LIE base station to configure a home cell and candidate cells with respect to a terminal.

Figure 6:
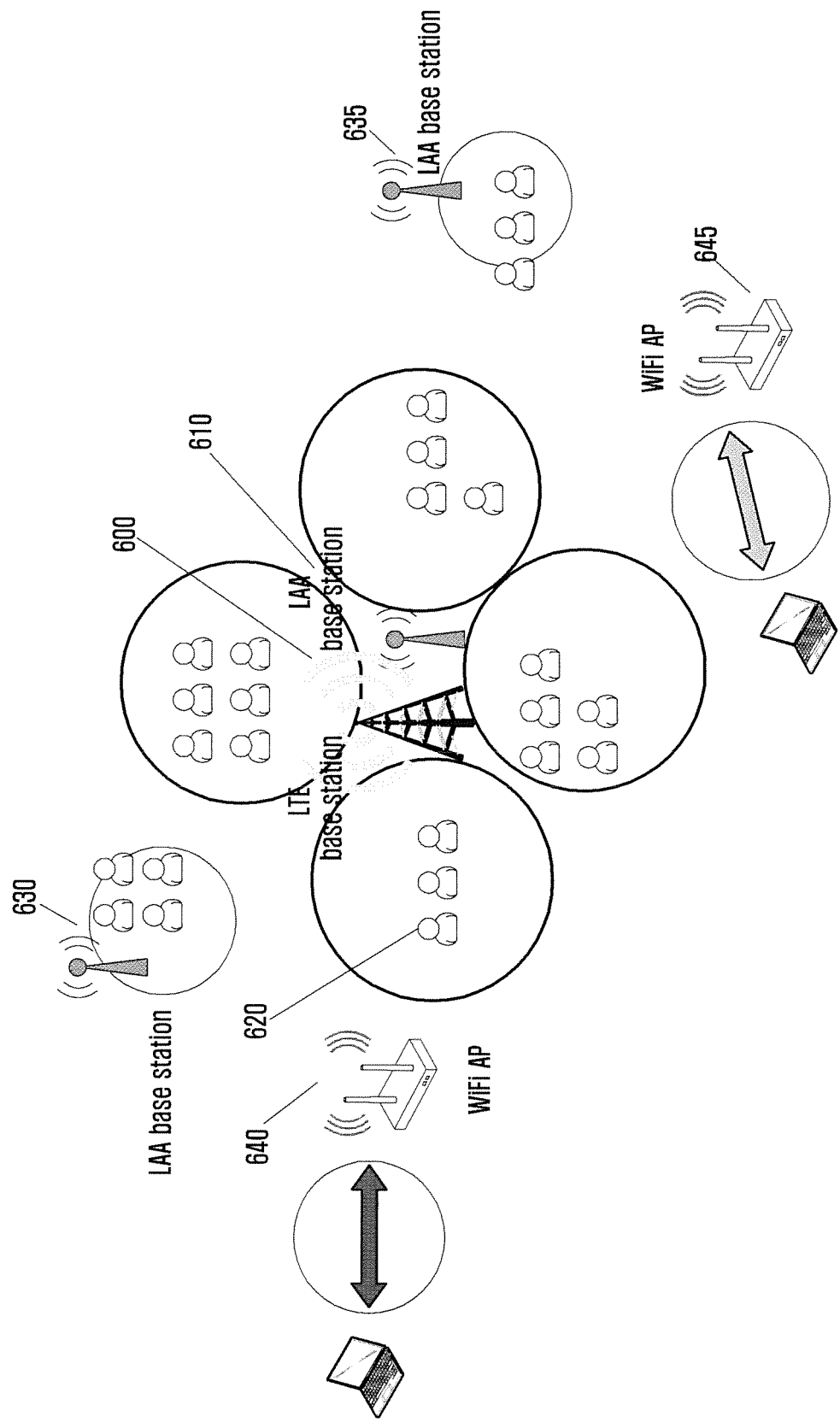
FIG. 6 is a diagram explaining a method for determining a home cell for each terminal through an LAA base station according to an embodiment of the present invention.

FIG. 6 is a diagram explaining a method for determining a home cell for each terminal through an LAA base station according to an embodiment of the present invention.

An LAA base station 310, which performs transmission through a cellular communication protocol that includes an LIE in an unlicensed band, may determine the best transmission cell (one or cell group) for each terminal 320 in accordance with the long-term average measurement result with respect to the transmission channel situations of the existing neighboring WiFI 340 and 345 and LAA base stations 330 and 345 and interference environments. In this case, the cell for each terminal in accordance with the determined long-term average measurement result may be called a home cell. The LTE base station 300 may transmit the RRC configuration message, which includes information on the home cell and information on a plurality of candidate cells of the LAA base station 310, to the terminal 320.

Figure 7:
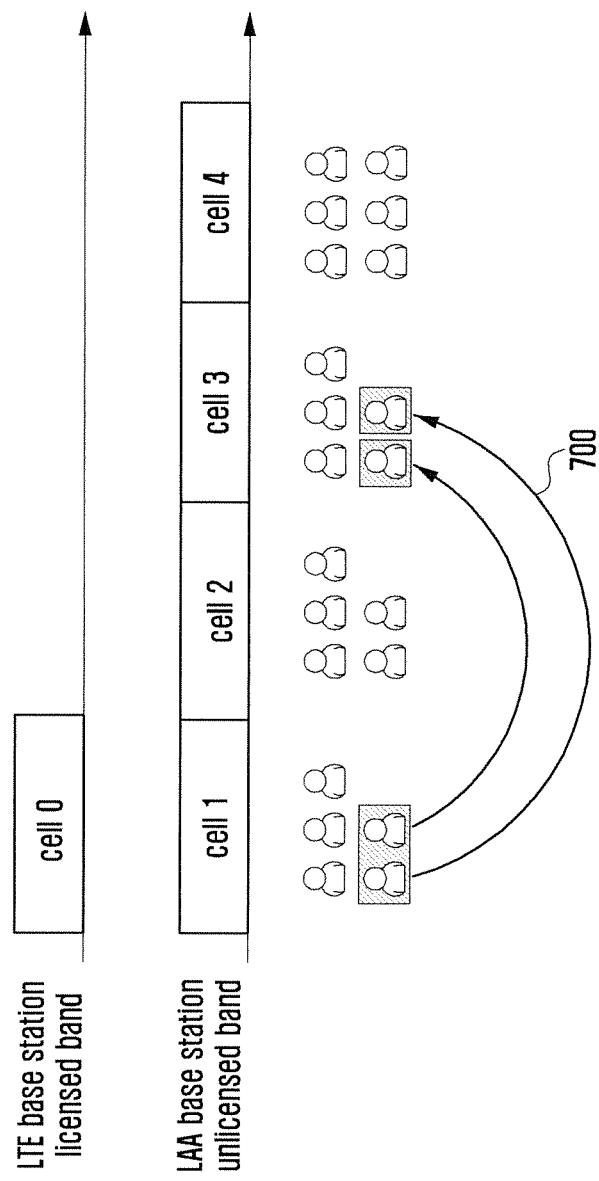
FIG. 7 is a diagram illustrating cells in used frequency bands of an LTE base station and an LAA base station according to an embodiment of the present invention.

FIG. 7 is a diagram illustrating cells in used frequency bands of an LTE base station and an LAA base station according to an embodiment of the present invention.

More specifically, FIG. 7 exemplarily illustrates channels between an LIE base station that performs transmission to a licensed band and an LAA base station that performs transmission to an unlicensed band. Since the LAA base station has RF capability that is higher than that of the terminal, a plurality of cells perform signal transmission to the terminal, and the terminal performs transmission to the home cell. As described above with reference to FIG. 3, the reference numeral "700" indicates, for example, a change of an activated cell from cell 1 to cell 3 in an unlicensed band of the LAA base station in the case where cell reselection is needed with respect to the terminal and a cell switching operation is performed.

Figure 8:
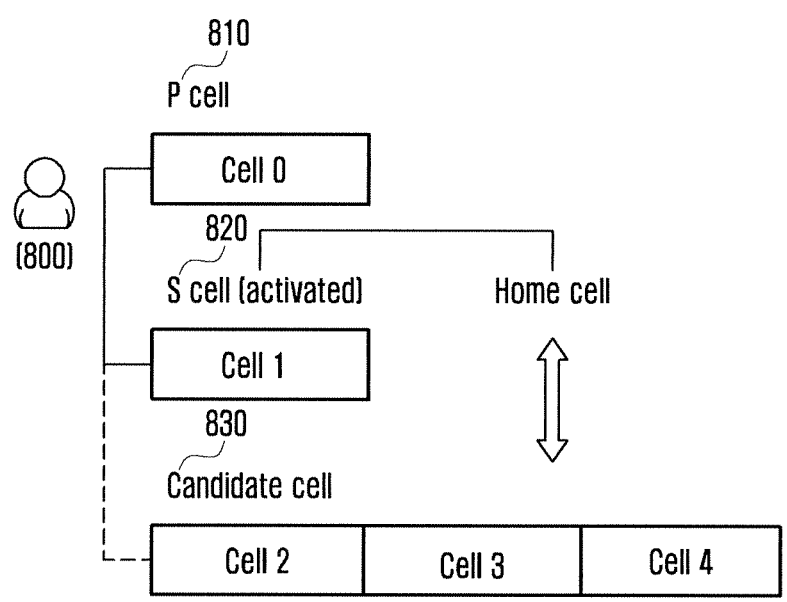
FIG. 8 is a diagram explaining a primary cell, a secondary cell, and candidate cells that are configured to a terminal according to an embodiment of the present invention.

FIG. 8 is a diagram explaining a primary cell, a secondary cell, and candidate cells that are configured to a terminal according to an embodiment of the present invention.

More specifically, FIG. 8 illustrates a Primary cell (Nell) 810 of an LTE base station, a Secondary cell (Scell) 820 of an LAA base station, and at least one candidate cell 830, which are configured by an RRC configuration message with respect to a terminal 800.

The cell in the Carrier-Aggregated (CA) LTE base station, which is initially configured in accordance with RF capability limitations of the terminal 800 and can be buffered in real time, may be the P cell, and the cell in the LAA base station may be the S cell. As described above with reference to FIG. 6, the S cell may be the home cell, which is the cell of the LAA base station and is selected as the best cell for the terminal in accordance with the long-term average measurement result. In addition, the LAA base station cell that is configured for the terminal may be newly defined as the Candidate (C) cell 830. The C cell is configured for the terminal in addition to the home cell, and if the cell reselection is needed for the terminal, the LAA base station may perform the switching request through prompt selection of the best cell at the current time.

Figure 9A:
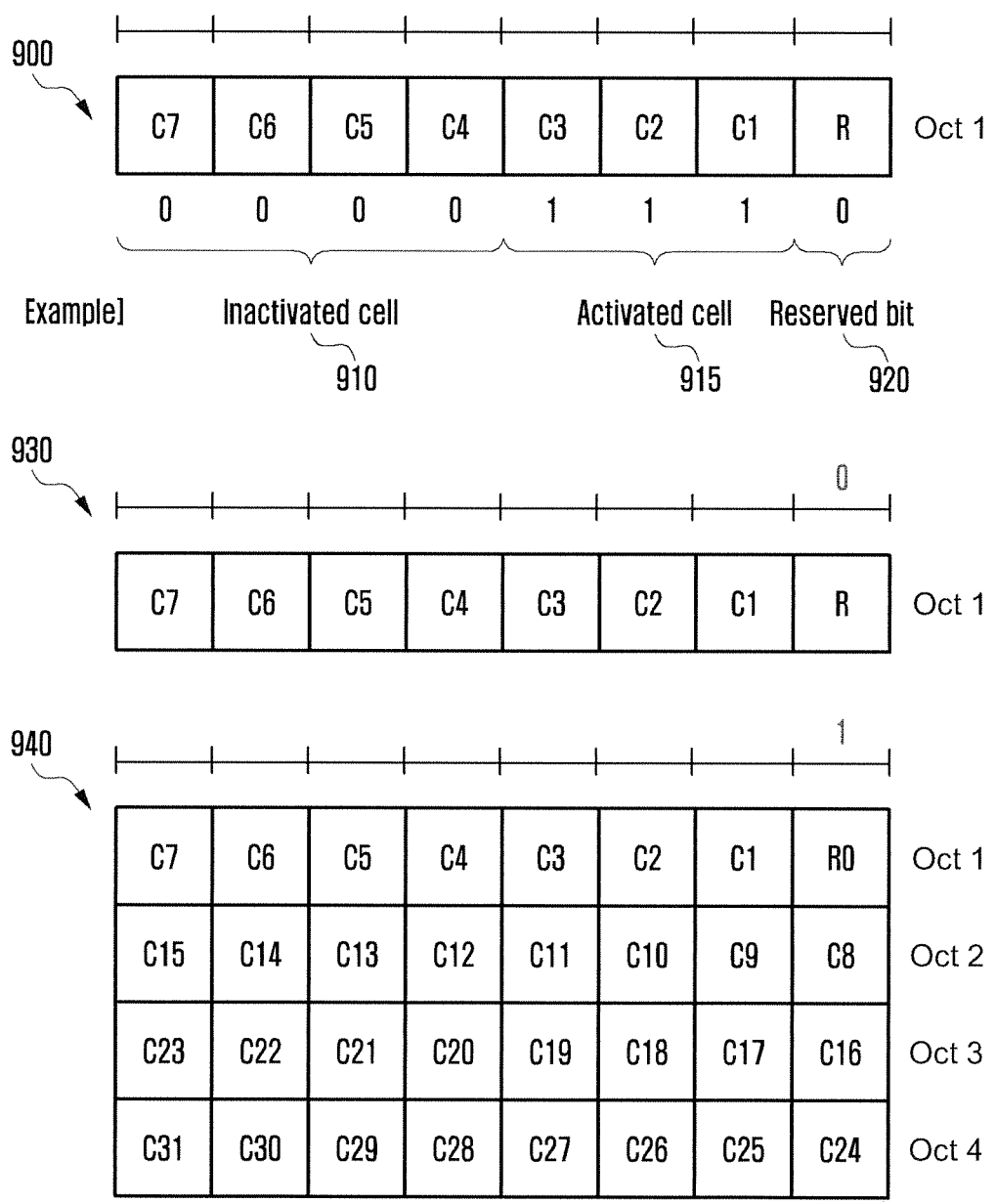
FIGS. 9A and 9B are diagrams explaining a Medium Access Control—Control Element (MAC-CE) structure that is used for a base station to configure activation and deactivation of a cell to a terminal according to another embodiment of the present invention.
Figure 9B:
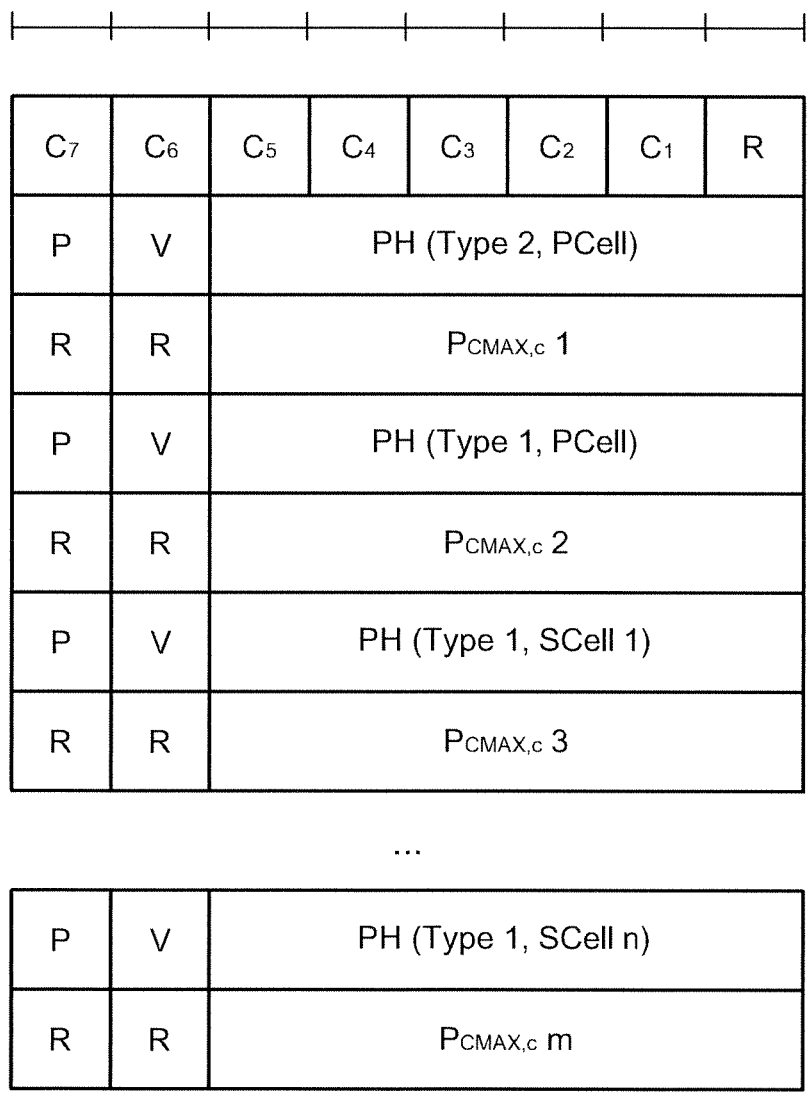

FIGS. 9A and 9B are diagrams explaining a Medium Access Control—Control Element (MAC-CE) structure that is used for a base station to configure activation and deactivation of a cell to a terminal according to another embodiment of the present invention.

More specifically, FIG. 9A explains a method for simplifying a procedure of transmitting information on activated cells using MAC-CE without transmitting an RRC connection reconfiguration message in the case of changing the activated cells for a terminal during a CA operation.

First, in the case where the terminal performs the CA operation, the MAC-CE 900 for performing activation/deactivation configuration with respect to a plurality of cells may configure activation of the corresponding cell in the case of setting Ci to "1", and may configure deactivation of the corresponding cell in the case of setting Ci to "0", with respect to pre-configured cells through an RRC connection reconfiguration message. In this case, the reserved bit has always been set to "0".

On the other hand, in the case where a plurality of cells that get over the capability of the terminal are configured as candidate cells with respect to the terminal, it is not possible to accommodate the plurality of cells in all through the existing MAC-CE format of 1 byte. Accordingly, the MAC-CE that is used for the activation and deactivation configuration requires a MAC-CE format that is more extended than the existing MAC-CE format of 1 byte. A method for using the extended MAC-CE format is as follows.

First is to use a fixed MAC-CE format of 4 bytes. That is, activation or deactivation of each cell may be configured using the MAC-CE format of 4 bytes regardless of the number of cells that are pre-configured to the terminal.

Second is to select and variably use a multi-format including a short MAC-CE format 930 and a long MAC-CE format 940. The long MAC-CE format 940 may be called an extended MAC-CE format. In this case, in order to notify the terminal of the MAC-CE format being used, the base station may use a method for explicitly indicating the MAC-CE with a reserved bit in the MAC-CE and a method for implicitly indicating the MAC-CE through a parameter SCellIndex that configures indexes of carrier aggregated cells. That is, in the case of the explicit indication method, if the reserved bit is "0", the existing short MAC-CE format 930 may be used, whereas if the reserved bit is "1", the extended long MAC-CE format 940 may be used. Further, in the case of the implicit indication method, the maximum SCellIndex value may be used in the process in which the base station configures the cell to be used in the terminal through the RRC reconfiguration message. For example, if SCellIndex is equal to or smaller than 7 in the RRC configuration message, the short MAC-CE format 930 of 1 byte for the cell activation/deactivation may be used, whereas if SCellIndex exceeds 7, the long MAC-CE format 940 of 4 bytes may be used.

Third is to predetermine and use four kinds of modes with respect to the MAC-CE format. For example, in the case of mode 1, the MCE-CE format of 1 byte may be determined, while in the case of mode 2, the MCE-CE format of 2 bytes may be determined. Further, in the case of mode 3, the MCE-CE format of 3 bytes may be determined, while in the case of mode 4, the MCE-CE format of 4 bytes may be determined. In this case, a new LCID may be indicated through addition of LCID (logical=11011) to the existing activation/deactivation MAC-CE.

FIG. 9B explains a method for using the MAC-CE format that is used according to the number of the plurality of configured cells, as described above with reference to FIG. 9A, as PHR MAC-CE.

That is, after the MAC-CE format is determined through the above-described method, activation or deactivation configuration may be performed with respect to the respective cells (may be used as Activation/Deactivation (AD) MAC-CE), and may be used as Power Headroom Report (PHR) MAC-CE. A case where the MAC-CE format is determined through the second method as described above with reference to FIG. 9A will be exemplarily described. If the short MAC-CE format 930 of 1 byte is determined by the explicit or implicit method, as illustrated in FIG. 9B, the PHR MAC-CE for the short MAC-CE format 930 of 1 byte may be used. Further, if the long MAC-CE format 930 of 4 bytes is determined, the PHR MAC-CE based on the long MAC-CE format 930 of 4 bytes may be used. It is apparent to those of ordinary skill in the art to which the present invention pertains to modify the PHR MAC-CE structure based on the short MAC-CE format 930 of 1 byte as illustrated in FIG. 9B into the PHR MAC-CE based on the long MAC-CE format 930 of 4 bytes to be used.

Through the activation or deactivation configuration method for a plurality of cells that are configured to the terminal using the extended MAC-CE as described above, the activation index in the MAC-CE can be changed (with consumption of about 24 to 34 ms) without transmission of the RRC connection reconfiguration message for additional cell information that has a great delay of about 250 to 450 ms, and thus the delay problem can be solved.

Figure 10:
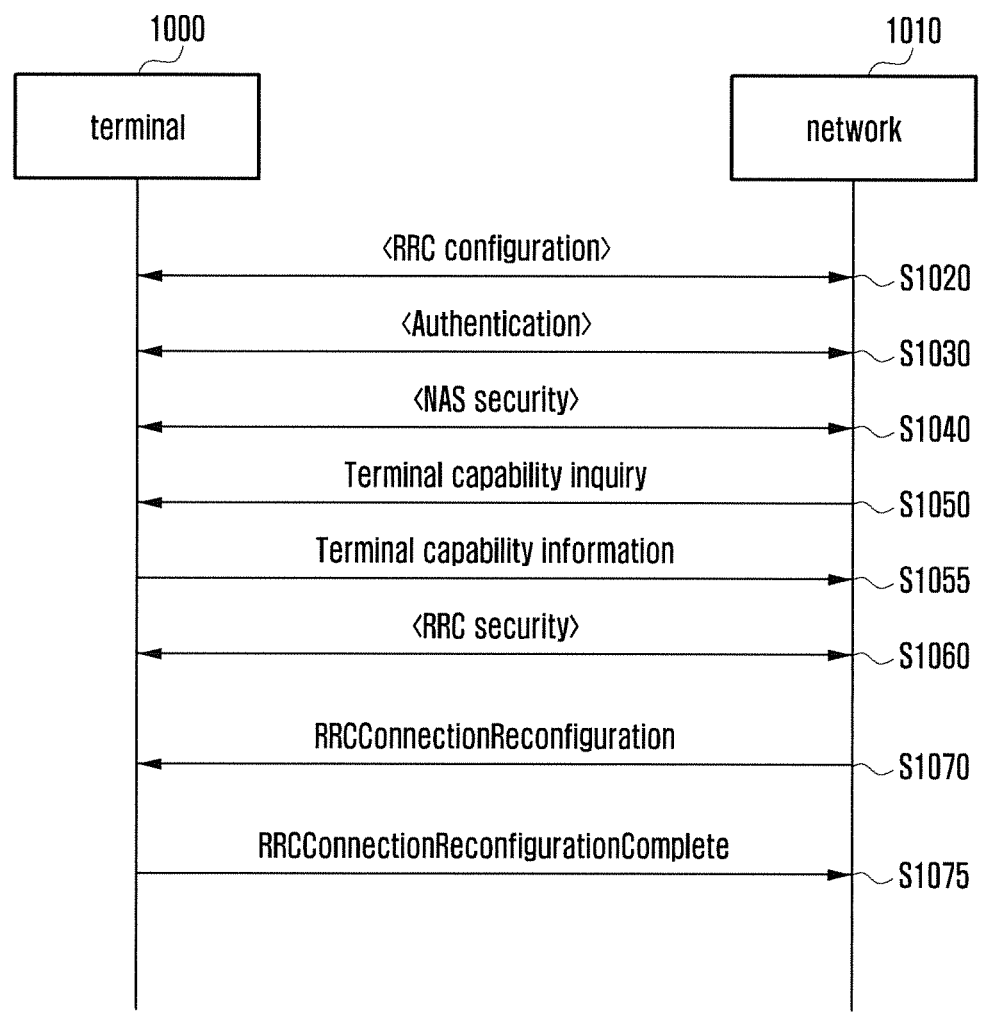
FIG. 10 is a diagram explaining a method for transferring a signal between a terminal and a network for initial configuration with respect to the terminal according to an embodiment of the present invention.

FIG. 10 is a diagram explaining a method for transferring a signal between a terminal and a network for initial configuration with respect to the terminal according to an embodiment of the present invention.

More specifically, FIG. 10 is to explain RF capability information for initial configuration of the terminal, an RRC connection reconfiguration message transmission procedure, and addition of RF tuning delay information during transmission of CA-related User Equipment (UE) capability information.

A network 1010 includes a cellular communication network including an LTE base station that is connected to a terminal to communicate with the terminal. The terminal 1000 and the network 1010 may establish RRC configuration (S1020). Thereafter, the terminal 100 and the network 1010 may perform an authentication procedure (S1030), and may perform Non-Access Stratum (NAS) security procedure (S1040). The above-described process may include a connection process between the general terminal and the network that belongs to the technical field according to the present invention.

Thereafter, the network 1010 may inquire of the terminal 1000 about the UE capability (S1050). The terminal 1000 may transmit the UE capability information in response to the inquiry. The UE capability information may include RF tuning delay information of the terminal. The RF tuning delay information may be delay time information that is consumed when the terminal performs the cell switching operation. The RF tuning delay information may include RF tuning delay information of intra-frequency within the same band and inter-frequency out of the current band.

The RF tuning delay information may differ depending on hardware that is implemented in the terminal and an RF related circuit operation. This can be satisfactorily designed when the terminal is implemented with conservative regulation of the maximum RF tuning delay. The RF tuning delay of the corresponding terminal may be divided into several grades through quantization to be reported to the base station. The base station may design the cell switching operation for each terminal to match the quantized grades of the RF tuning delay that is reported by the corresponding terminal. Further, the base station may conservatively design the cell switching operation to match the largest delay time among the quantization grades of the RF tuning delay that is reported by the connected terminal.

The RF tuning delay information that is added to the UE capability information may be used for the LAA base station to compare costs when the LAA base station determines whether to reselect the cell afterward. That is, the RF tuning delay information may be used during comparison of waiting time in the home cell or switching times to a target cell. Further, the RF tuning delay information may be used to determine a reservation time for precedent occupation of the target cell by the LAA base station. After a cell switching request message for the target cell is transmitted to the terminal, a reservation signal (preamble) may be transmitted to the target cell in consideration of the time that is required for the corresponding terminal to perform the cell switching.

Figure 11:
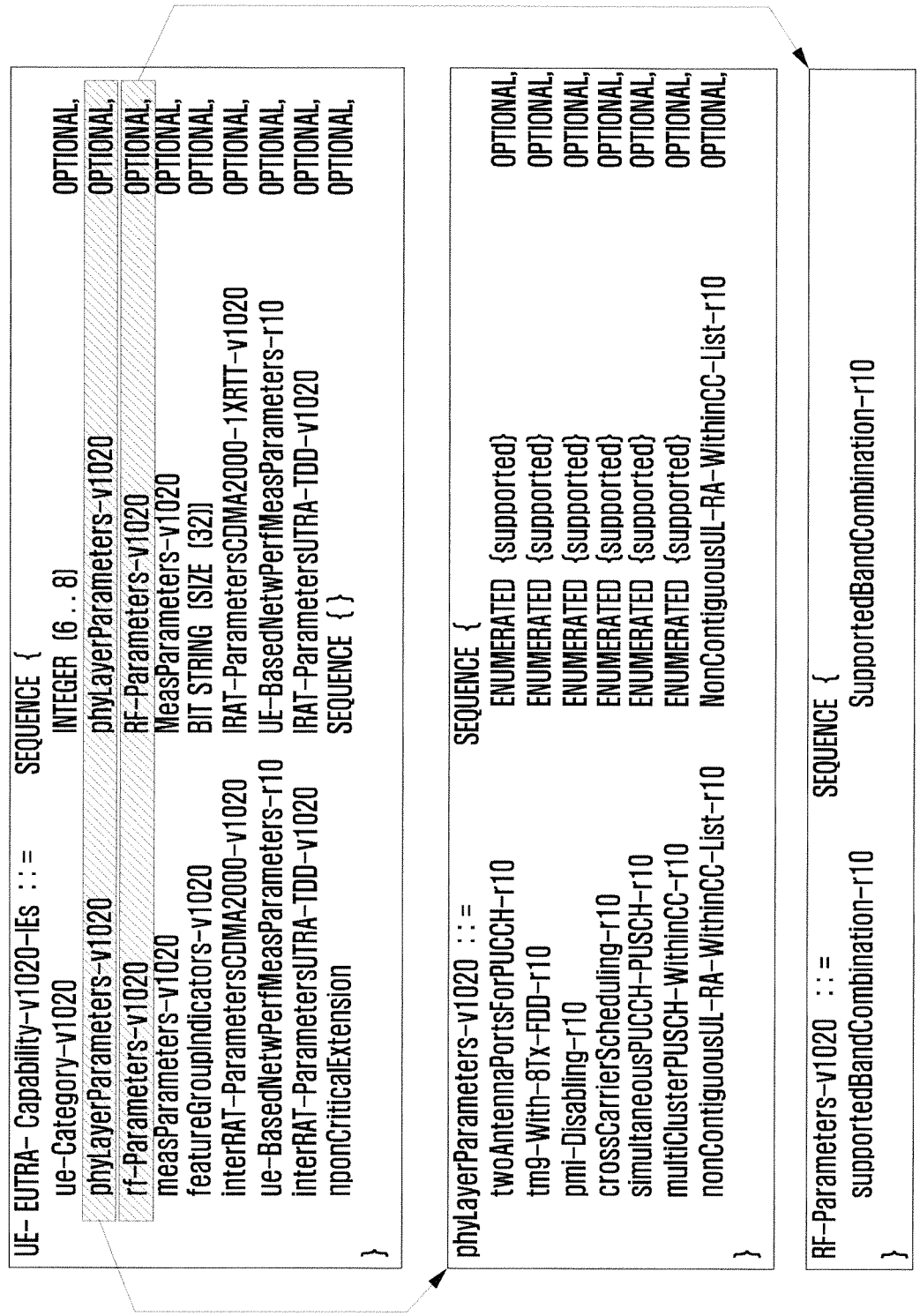
FIG. 11 is a diagram materializing terminal capability information that a terminal transmits to a base station according to an embodiment of the present invention.

Thereafter, the terminal 1000 and the network 1010 may perform the RRC security procedure (S1060). Then, if needed, the network 1010 may transmit the RRC connection reconfiguration message to the terminal 1000 (S1070), and if the RRC reconfiguration is completed, the terminal 1000 may transmit an RRC connection reconfiguration complete message (S1075). FIG. 11 is a diagram materializing terminal capability information that a terminal transmits to a base station according to an embodiment of the present invention. The terminal may transmit the UE capability information, which includes the RF tuning delay information for each terminal as described above, to the base station.

Figure 12:
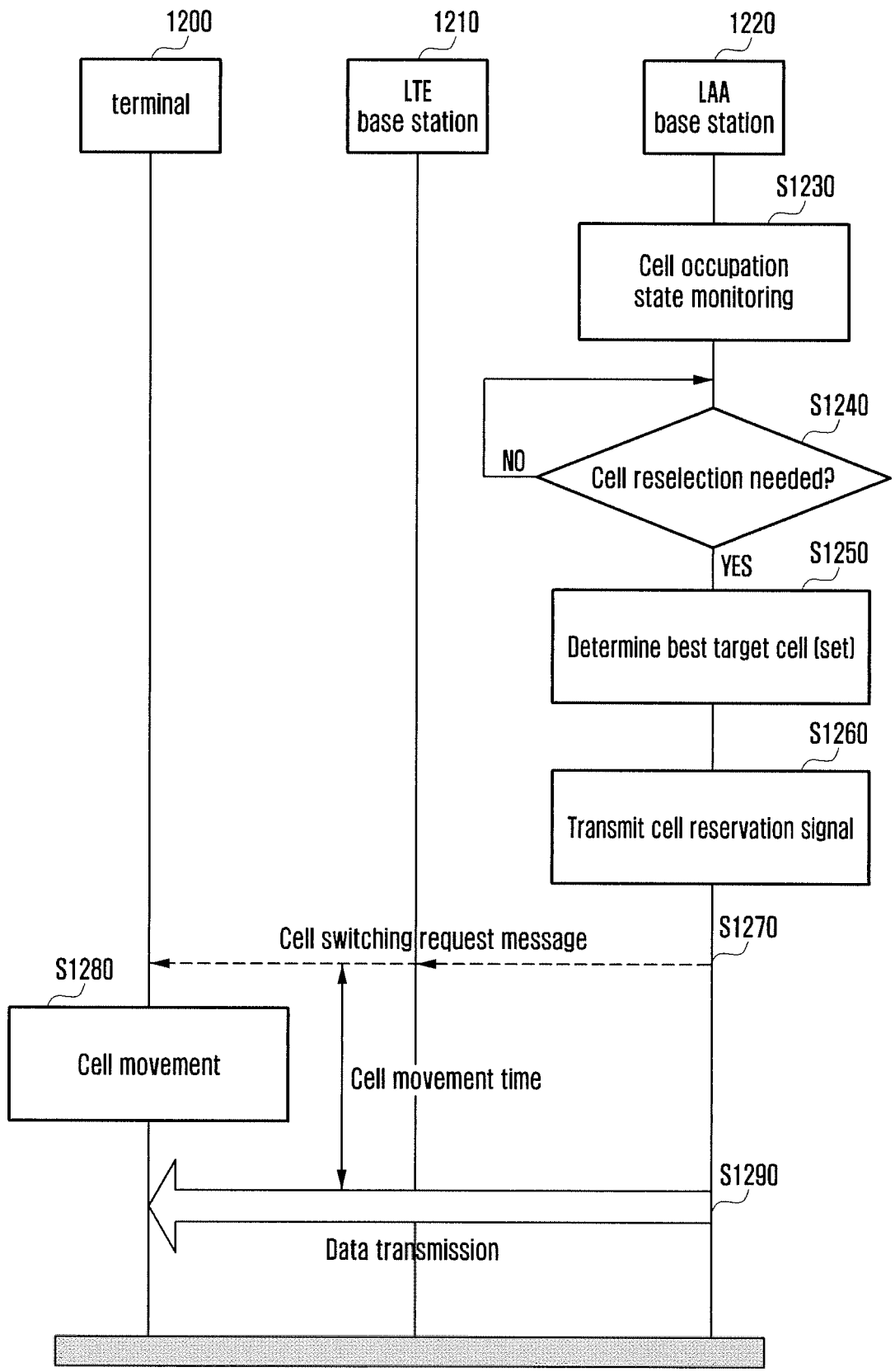
FIG. 12 is a diagram materializing operations of a terminal, an LTE base station, and an LAA base station for cell switching according to an embodiment of the present invention.

FIG. 12 is a diagram materializing operations of a terminal, an LTE base station, and an LAA base station for cell switching according to an embodiment of the present invention.

More specifically, FIG. 12 is to explain the operation of an LAA base station 1220 after a plurality of cells that get over the RF capability of the terminal are configured to the terminal using an RRC configuration message and a MAC-CE for cell activation/deactivation. Thereafter, the LAA base station 1220 may monitor a cell occupation state (S1230). Thereafter, the LAA base station may determine whether cell reselection is needed (S1240). If the cell reselection is needed, the LAA base station 1220 may determine the best target cell (or target cell set) for the terminal (S1250). If the target cell is determined, the LAA base station 1220 may transmit a cell reservation signal to the target cell (S1260). Thereafter, the LAA base station 1220 may transmit a cell switching request message for the target cell to the corresponding terminal 1220 (S1270).

In transmitting the cell switching request message, since it is not yet possible for the corresponding terminal to directly allocate transmission resources to the target cell in an unlicensed band, a PCell of the LIE base station or a serving cell of the LAA base station, which is currently connected, may transmit the cell switching request message. The cell switching request message may include information on a home cell, information on a target cell for movement, center frequency information, bandwidth information, and information on transmission power. Further, the cell switching request message may selectively include whether to receive PDCCH, data transmission start time information, or information on a home channel return timer. The information on whether to receive the PDCCH is information on whether activation of the corresponding cell is to simply measure the RRM (PDCCH reception is not needed) or to receive data traffic (PDCCH reception is needed). The above-described information is merely exemplary, and information that is included in the cell switching request message is not limited thereto.

Further, since the cell switching request message is transmitted through the PDCCH, it is possible to shorten the time that is required for channel change indication and channel change by the terminal. In the case of using the RRC connection reestablishment message that corresponds to the existing scheme, time of about 250 ms to 450 ms is consumed, and thus delay occurs in performing RRC release and RRC addition procedures. Further, in the related art, in the case of adding or deleting the SCell from the CA system, the RRC connection reconfiguration message is used, and in the case of configuring the activation/deactivation state of the SCell, MAC-CE (i.e., activation/deactivation MAC-CE, LCID (logical=11011) is used. In this case, on the assumption of two or three times ARQ, time of about 24 ms is consumed. On the other hand, in the method using L1 signaling according to the present invention, time of about 0.45 ms that corresponds to 6 symbols is consumed. More detailed calculation will be mad later with reference to FIG. 22.

Thereafter, the terminal 1220 may perform cell movement to the target cell (S1280). In the case of transmitting a response message to the cell switching request after completion of the cell movement, the LAA base station 1220 may transmit data to the terminal 1200 (S1290).

FIGS. 13 to 17 are diagrams related to an operation of the LAA base station to monitor the cell occupation state.

Figure 13:
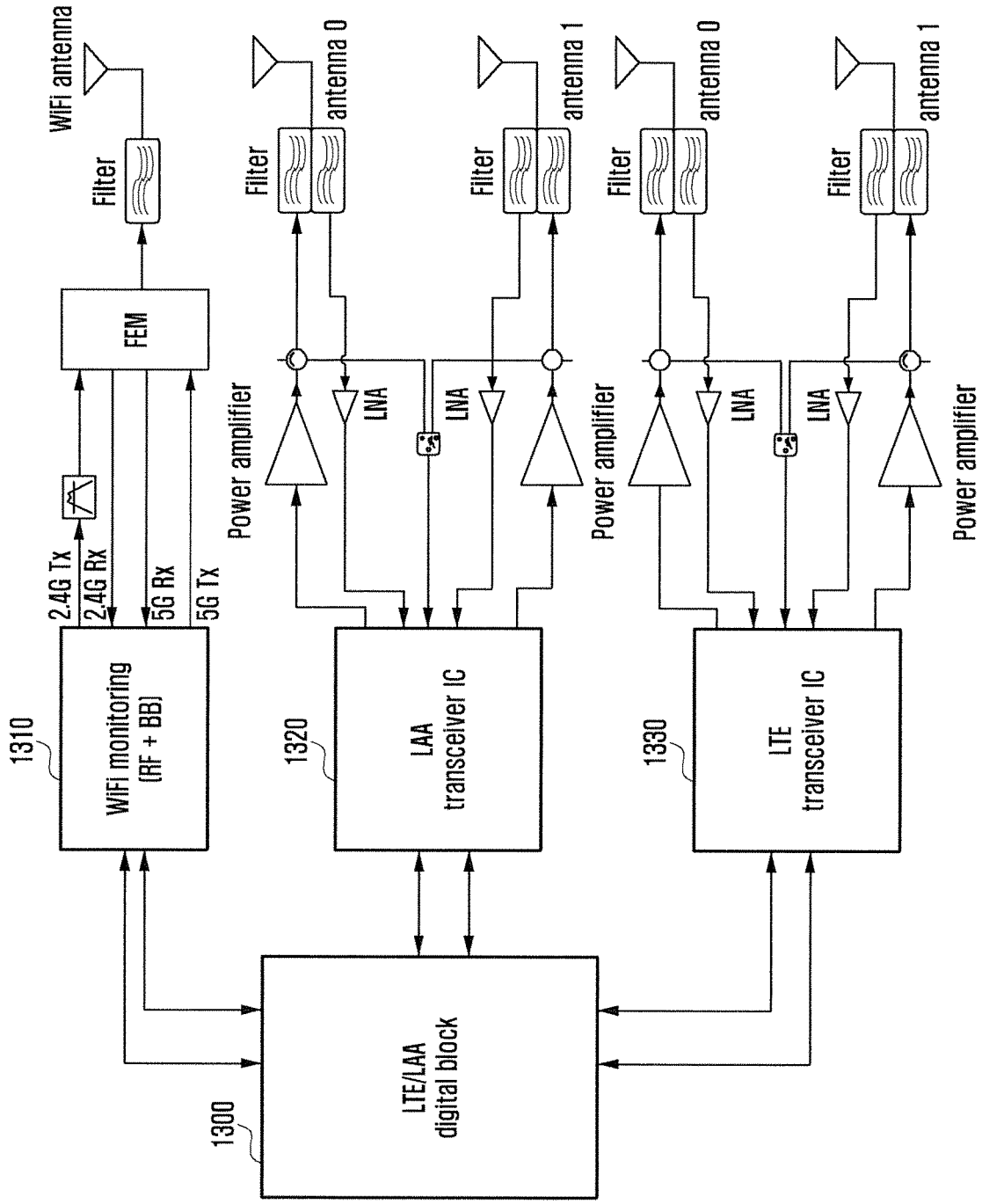
FIG. 13 is a block diagram illustrating internal configurations of an LTE base station and an LAA base station according to an embodiment of the present invention.

FIG. 13 is a block diagram illustrating internal configurations of an LTE base station and an LAA base station according to an embodiment of the present invention.

More specifically, in the case where an LTE base station and an LAA base station constitute a physically single base station, the current cell occupation state can be monitored using a WiFi monitoring module 1310 of the LAA base station, an LAA transceiver IC module 1320, and an LTE transceiver IC module 1330. In addition, future residual transmission time of Radio Access Technology (RAT) that uses various communication methods can be confirmed. As a method for confirming the residual transmission time, for example, overhearing of the base station and a difference between feedback positions of a multi-terminal.

More specifically, the residual transmission time can be grasped even with respect to communication devices that use different communication methods through decoding of length fields or Network Allocation Vectors (NAV) of signals of other communication devices through the WiFI monitoring module 1300.

Further, in the case where the same LAA base station performs transmission to a different terminal, the LAA base station may grasp the transmission time of the corresponding connection. In the case of transmission of another LAA base station, the occupation state can be grasped through a method using CCA, that is, energy detection. Further, the residual transmission time can be grasped by monitoring the PDCCH through addition of a new field that is specified by the transmission time to the PDCCH. However, although not illustrated in the drawing, it is apparent to those of ordinary skill in the art to which the present invention pertains to apply the present invention to an embodiment in which the LTE transceiver IC module and the LAA transceiver IC module exist in physically different base stations.

Figure 14:
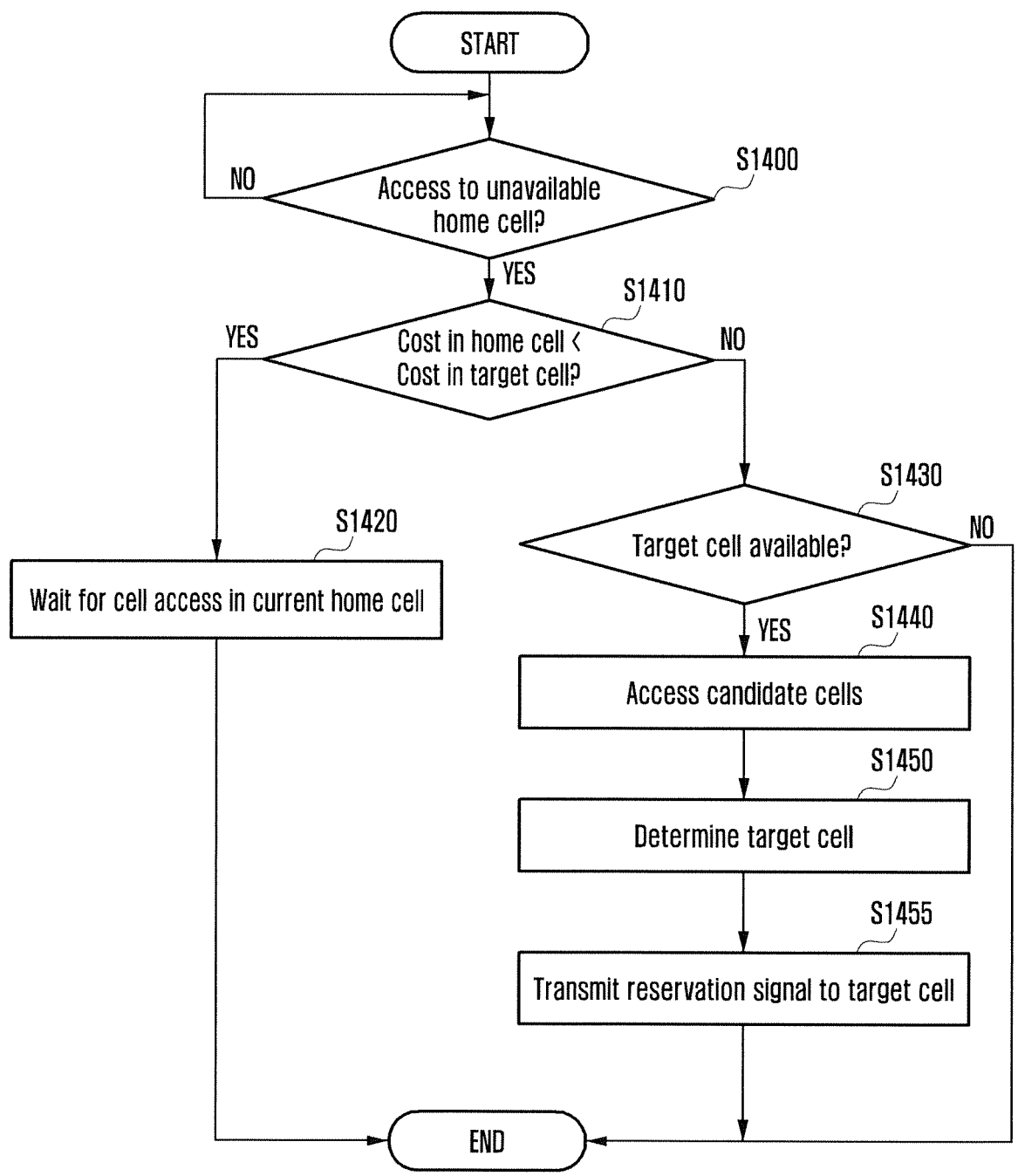
FIG. 14 is a diagram explaining a method for determining whether to perform cell switching through an LAA base station according to an embodiment of the present invention.
Figure 15:
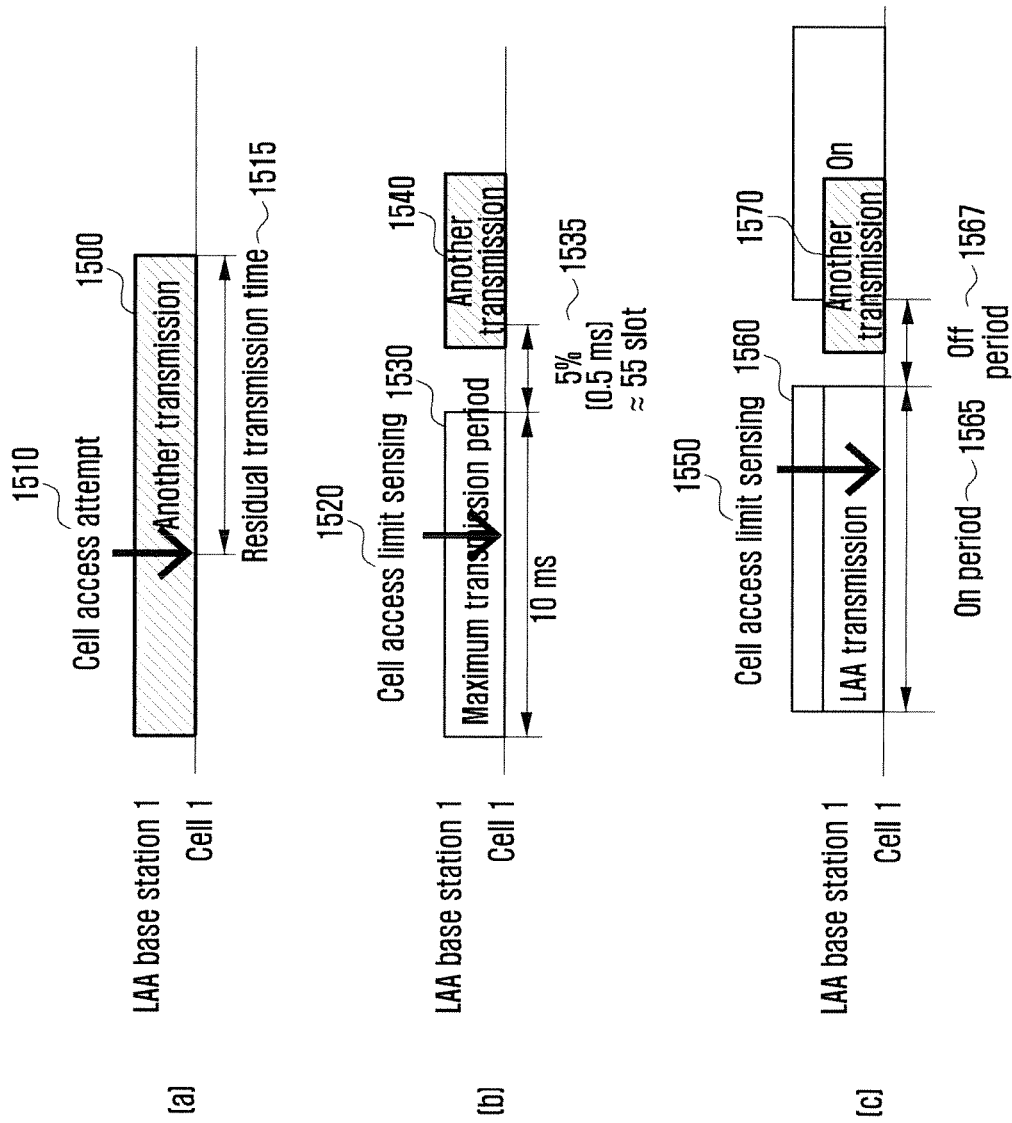
FIGS. 15A to 15C are diagrams explaining an operation of an LAA base station to monitor a cell occupation situation of another communication device in an unlicensed band according to an embodiment of the present invention.

FIG. 14 is a diagram explaining a method for determining whether to perform cell switching through an LAA base station according to an embodiment of the present invention.

More specifically, FIG. 14 illustrates the operation of the LAA base station which monitors the occupation state, determines whether cell reselection is needed, determines a target cell, and transmits a reservation signal.

First, the LAA base station may determine whether an access to an unavailable home cell is attempted (S1400). That is, the LAA base station may determine a case where another transmission is performed when an access to a home cell, that is, a currently activated cell, is attempted, or a case where transmission at a future time is not possible. An example of the access to the unavailable home cell will be described later with reference to FIGS. 15A to 15C.

Thereafter, the LAA base station may determine whether the cost in the home cell is smaller than the cost in the target cell (S1410). The cost may be time that is required to perform the operation. That is, expected values for reselection of other cells on the basis of the residual transmission time of the current home cell may be compared with each other as follows.

Minimum waiting time of home cell>Cell switching cost($T\_cost$)+Alpha

The cell change cost ($T\_cost$) may be determined on the basis of information on the RF tuning delay of UE capability information that the terminal has transmitted to the LAA base station as described above.

If the cost in the home cell is smaller than the cost in the target cell, the LAA base station may wait for the cell access in the current home cell (S1420). If the LAA base station determines that the cost in the home cell is equal to or higher than the cost in the target cell at operation S1410, it may determine whether the target cell is available (S1430). That is, the terminal may confirm transmission possibility to another cell among predetermined candidate cells. That is, the terminal may confirm whether the target cell is in an idle state at the present time, and if the target cell is in the idle state, the terminal may confirm whether the channel can be preoccupied. Further, the terminal may confirm whether signal transmission can be completed within a marginal time $T\_margin \sim T\_cost$ in the target cell. The marginal time means time that is within a range that is smaller than the cell switching cost $T\_cost$ in the home cell that is currently a serving cell to the extent of $T\_margin$. That is, in the case where transmission of a signal of another communication device is completed in the marginal time that is within the cell switching cost $T\_cost$ from the home cell even if another communication device transmits the signal in the target cell, the terminal may determine that transmission to the target cell is possible.

In order to confirm the residual transmission time of another transmission in the target cell, the residual transmission time may be measured through an LAA base station monitoring module. Further, in the case of another communication device, for example, in the case of WiFi transmission, it may be measured using duration information of a NAV message. Further, in the case of the transmission of another LAA base station, it may be acquired through decoding of the PDCCH information.

In the case where the target cell is available, the terminal can access predetermined candidate cells (S1440). Thereafter, the LAA base station may determine the target cell (S1450). The LAA base station may selectively transmit the reservation signal to the determined target cell (S1455).

FIGS. 15A to 15C are diagrams explaining an operation of an LAA base station to monitor a cell occupation situation of another communication device in an unlicensed band according to an embodiment of the present invention.

FIG. 15A illustrates a case where when a cell access is attempted in the currently activated cell 1 (1510), cell occupation is waited for since another transmission is being performed and the residual transmission time 1515 remains. In this case, when the CCA is performed with respect to the corresponding cell, it is sensed that another transmission is being performed.

FIG. 15B illustrates an example in which it is sensed that future transmission is not possible. That is, in the case of securing the maximum transmission period 1530 with respect to the current cell, another transmission 1540 has already been scheduled in the corresponding cell, and thus CCA idle time cannot be observed. After the maximum transmission period 1530 is ended, transmission should be stopped for a time that corresponds to 5% of the maximum transmission period 1530 according to the CCA regulations.

In this case, the scheduling situation of the other transmission 1540 can be monitored during the transmission period, and thus cell access limitations can be sensed (1520).

In the same manner as FIG. 15B, FIG. 15C illustrates an example in which it is sensed that future transmission is not possible. The duty cycle for each channel can be adjusted to improve the coexistence performance with another RAT, such as WiFi, in the unlicensed band. That is, the cell can be occupied only in an ON period for each cell, and in the case where another transmission 1570 has already been scheduled in an OFF period 1567 even if the LAA base station is currently transmitting the signal in the ON period 1565 (1560), the OFF period 1567 cannot be observed. In this case, the LAA base station can monitor the scheduling situation of the other transmission 1570 during the LAA transmission, and thus the cell access limitations can be sensed to observe the OFF period 1567 of the duty cycle (1550).

Figure 16:
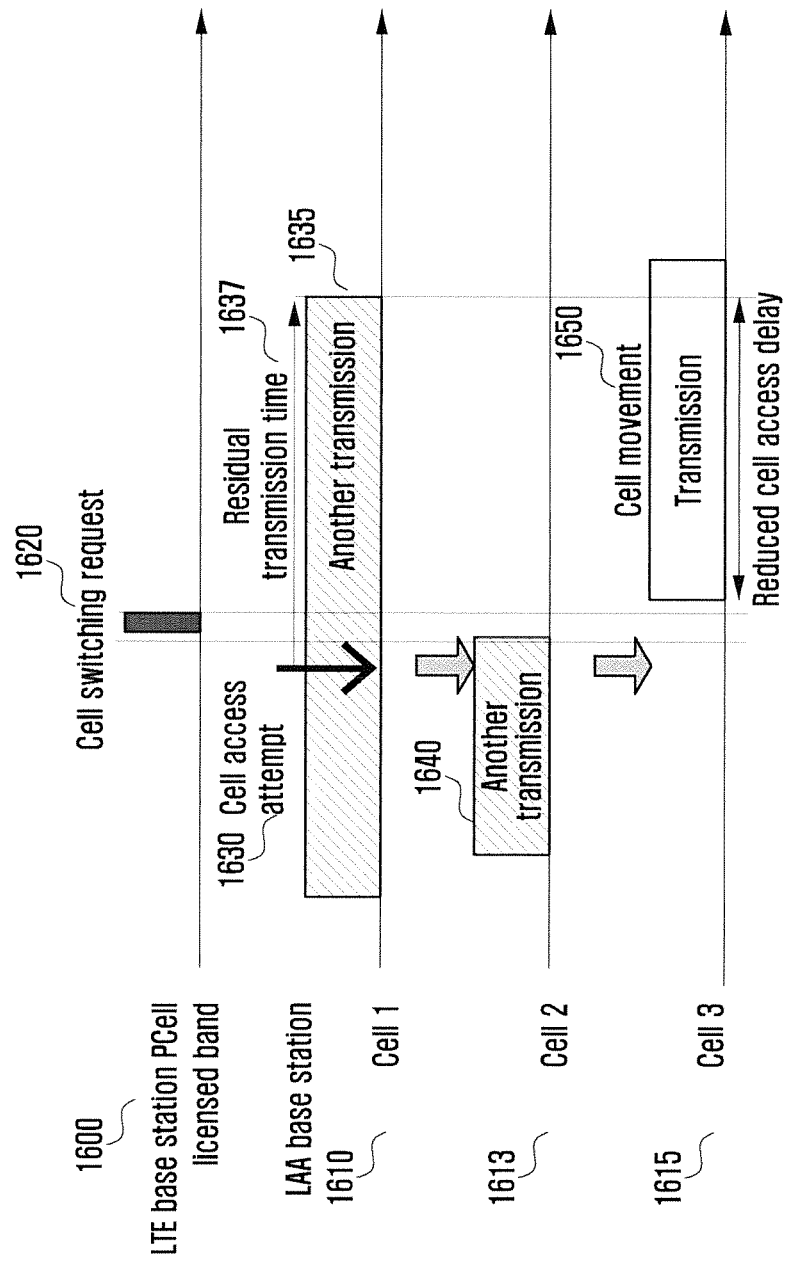
FIG. 16 is a diagram explaining a method for selecting a dynamic cell in accordance with a monitoring operation of a cell occupation situation through an LAA base station according to an embodiment of the present invention.

FIG. 16 is a diagram explaining a method for selecting a dynamic cell in accordance with a monitoring operation of a cell occupation situation through an LAA base station according to an embodiment of the present invention.

More specifically, as described above with reference to FIG. 15A, FIG. 16 illustrates a case where when a cell access is attempted in the currently activated cell 1 1610 of the LAA base station (1630), another transmission 1635 is performed, and it is sensed that the residual transmission time 1637 remains. In this case, expected values for reselection of other cells on the basis of the residual transmission time 1637 of the current cell may be compared with each other. As described above, the residual transmission time can be measured through the monitoring module of the LAA base station. That is, in the case of WiFi transmission, duration information of a NAV message may be used, while in the case of another LAA base station transmission, the PDCCH information may be used.

The transmission possibility to another cell may include whether the target cell is currently in an idle state and whether the cell can be preoccupied. Further, it can be confirmed whether the transmission can be completed within a target marginal time. The details thereof will be described later with reference to FIGS. 19A and 19B.

When the transmission possibility in cell 2 1613 is determined, another transmission 1640 is performed at the present time, and thus transmission is not possible. In the case of cell 3 1615, it is determined that there is not another transmission at present and there is not another scheduled transmission even at future time, and thus a cell switching request 1620 can be transmitted. Thereafter, in the case where the LAA base station transmits data to a terminal (1650) after the terminal moves the cell, that is, switches the activated cell to cell 3, it can be known that cell 1 1610 that is the home cell has a reduced cell access delay as compared with that in waiting for the residual transmission time 1637.

Figure 17:
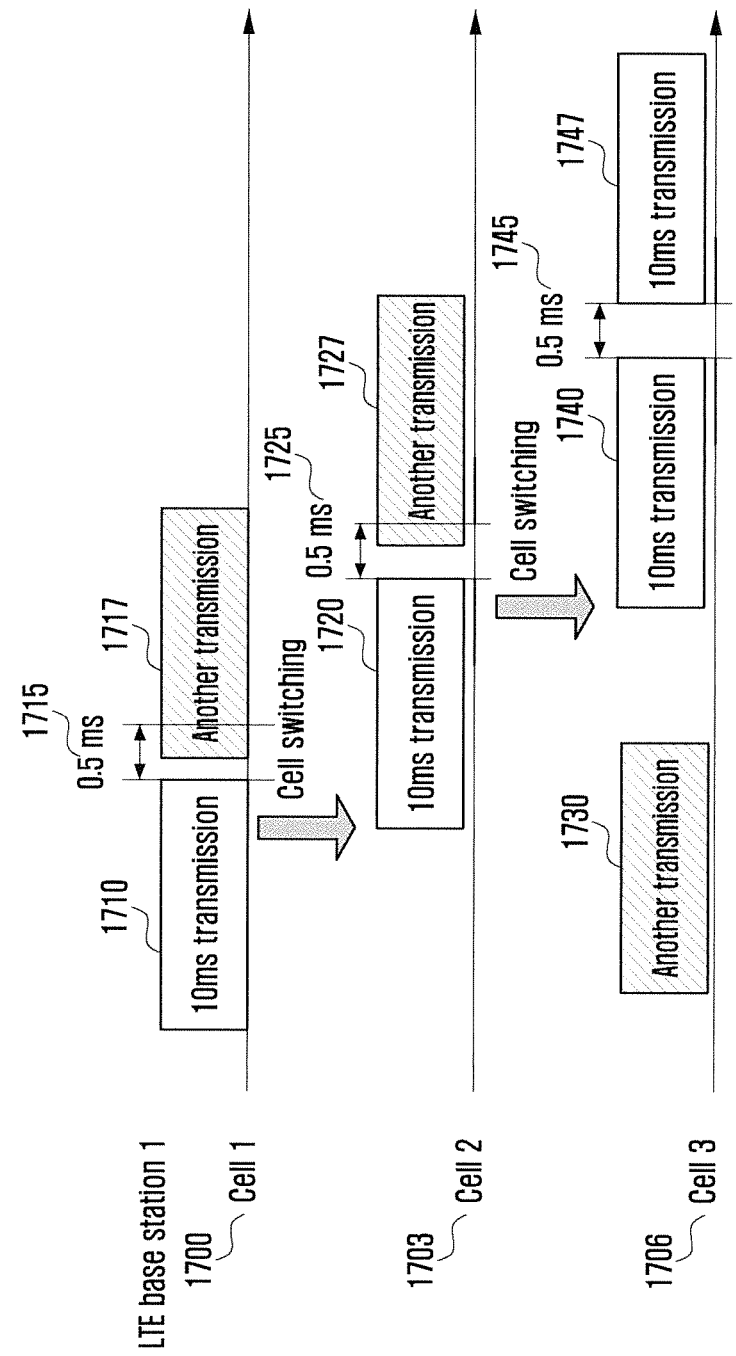
FIG. 17 is a diagram explaining a method for selecting a dynamic cell in accordance with a monitoring operation of a cell occupation situation through an LAA base station according to another embodiment of the present invention.

FIG. 17 is a diagram explaining a method for selecting a dynamic cell in accordance with a monitoring operation of a cell occupation situation through an LAA base station according to another embodiment of the present invention.

More specifically, FIG. 17 illustrates a case where another transmission has already been scheduled at future time and thus CCA idle time cannot be observed as described above with reference to FIG. 4. That is, if it is sensed that the CCA idle time 1715 cannot be observed due to scheduling of another transmission 1717 at the future time during 10 ms transmission 1710 that corresponds to the maximum transmission period in cell 1 1700, the cell is reselected in advance to perform the cell switching operation. In the case where the 10 ms transmission 1720 that corresponds to the maximum transmission period is performed even if the cell is switched to cell 2 1703, the CCA idle time 1725 cannot be observed due to scheduling of another transmission 1727 at the future time, and thus cell switching to cell 3 1706 can be performed. Since there is not another scheduled transmission at the future time when cell switching is determined in cell 2 1703, the LAA base station may perform 10 ms transmission 1740 after the cell switching, observe 0.5 ms idle time 1745, and successively perform 10 ms transmission 1747.

Figure 18:
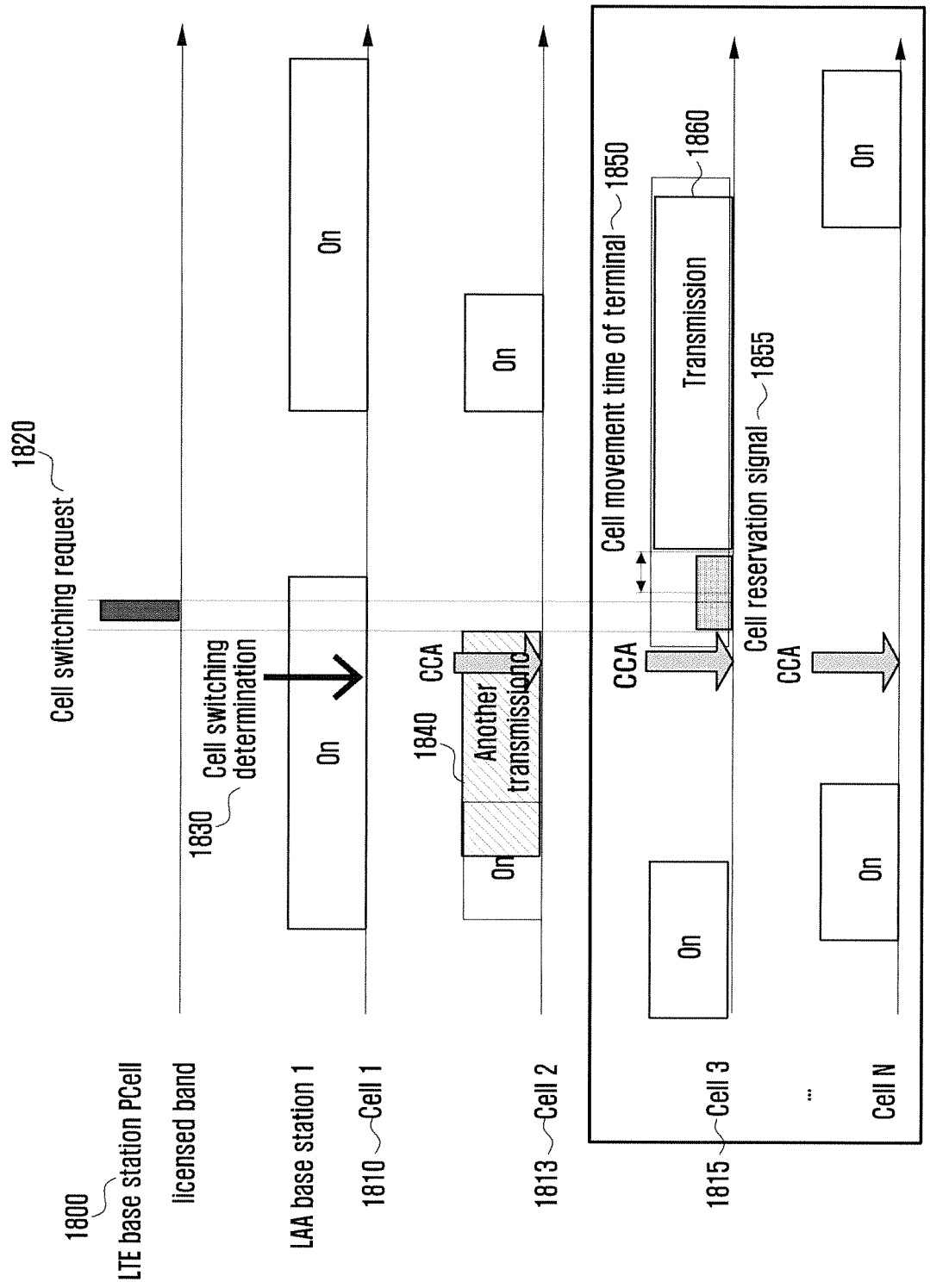
FIG. 18 is a diagram explaining a method for selecting a dynamic cell in accordance with a monitoring operation of a cell occupation situation through an LAA base station according to still another embodiment of the present invention.

FIG. 18 is a diagram explaining a method for selecting a dynamic cell in accordance with a monitoring operation of a cell occupation situation through an LAA base station according to still another embodiment of the present invention.

More specifically, as described above with reference to FIG. 15C, FIG. 18 illustrates a case where when a duty cycle is configured, it is determined that all signals cannot be transmitted in an ON period of the duty cycle. The duty cycle is a period in which cell occupation time is determined for each channel in order to improve coexistence performance with another RAT, such as WiFi, in an unlicensed band. That is, the cell can be occupied only in the ON period for each cell, and thus the duty cycle can be adjusted in accordance with an interference level.

If it is determined that all signal cannot be transmitted within the ON period when the currently activated cell 1 1810 attempts a cell access, the LAA base station may determine the cell switching (1830). Thereafter, other cells may perform the CCA to confirm cell selection possibility. As illustrated in FIG. 18, in the case where the existence of another transmission 1840 is sensed through performing of the CCA in cell 2 1813, the CCA can be performed in the next cell 3 1815. In the case where an idle state is confirmed in cell 3 1815 and an ON period of the duty cycle can be adjusted to be long due to low interference level of another communication device in cell 3 1815, a cell switching request 1820 may be transmitted from a P cell of the LIE base station to a terminal. During a time 1850 when the terminal moves from cell 1 1810 to cell 3 1815, the LAA base station may transmit a cell reservation signal to cell 3 1815 (1855). The LAA base station may transmit a signal to the terminal during the ON period in cell 3 1815.

Figure 19A:
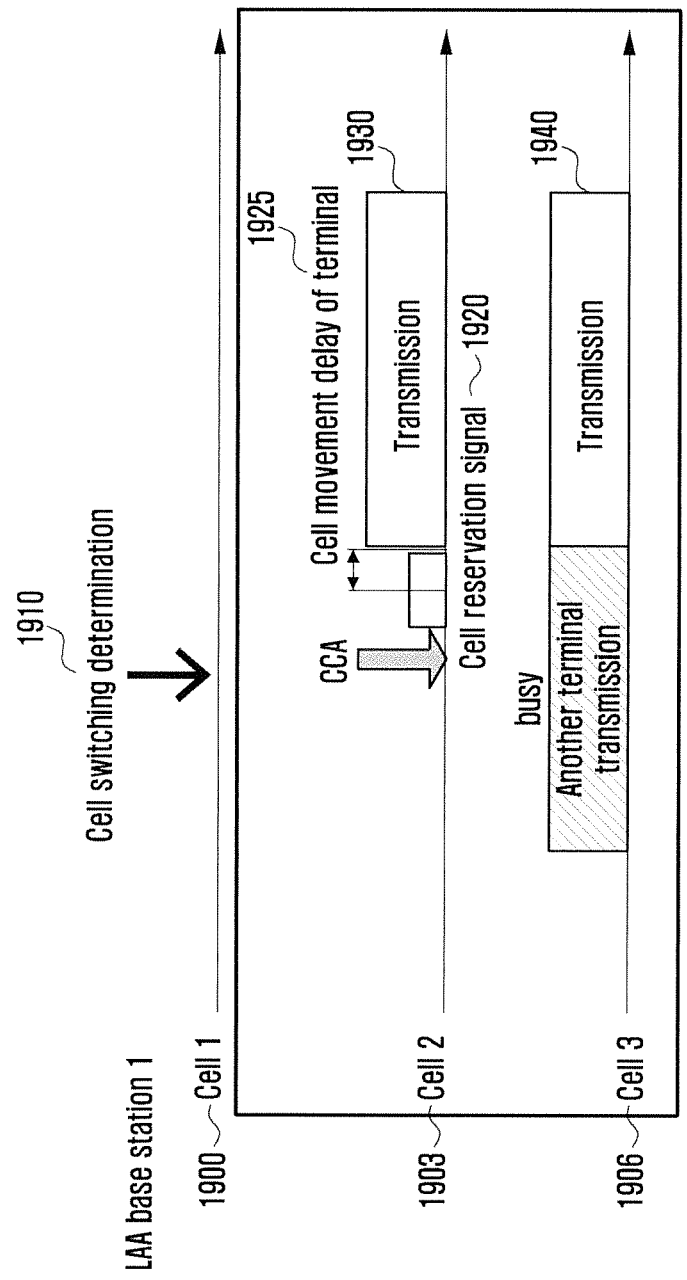
FIGS. 19A and 19B are diagrams explaining a method for selecting a target cell through an LAA base station according to an embodiment of the present invention.
Figure 19B:
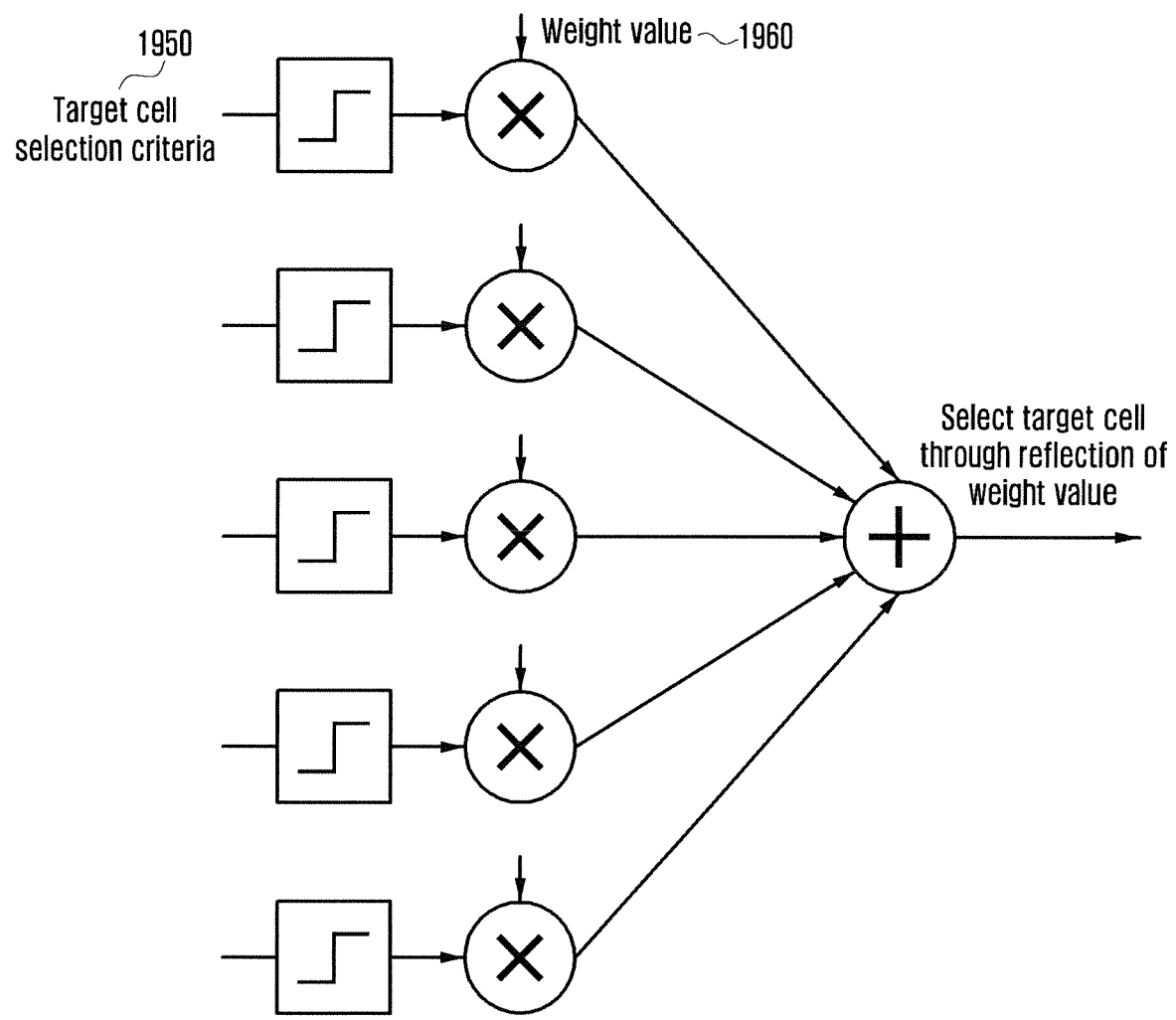

FIGS. 19A and 19B are diagrams explaining a method for selecting a target cell through an LAA base station according to an embodiment of the present invention.

More specifically, FIGS. 19A and 19B are to explain selection criteria for a target cell among remaining candidate cells 1903 and 1906 in the case where cell switching is determined in a currently activated cell of an LAA base station, that is, cell 1 1900 that is a home cell (1910). The selection criteria for the target cell may be based on at least one of those as described below. Further, weight values may be given to and combined with the following criteria. A process of selecting a plurality of target cells is illustrated in FIG. 19B. More specifically, the LAA base station may consider at least one of target cell selection criteria 1950 to be described below, and may select the target cells through reflection of predetermined weight values 1960 therein.

- Select the cleanest cell (channel) that is least occupied by other communication devices using the CCA result
- Avoid Wi-Fi primary cells (channels)
- Avoid other LAA (LTE-U) operator cells (channels)
- Select measurement basis using Received Signal Strength Indicator (RSSI) with respect to a beacon signal of Wi-Fi AP Select a cell based on whether Wi-Fi transmission is made by a primary cell or a secondary cell Select a cell based on (LAA UE) WiFi measurements over RRC LAA network listening measurements Channel Quality Indicator (CQI) or Block Error Ratio (BLER) reported by LAA terminal LAA terminal Radio Resource Management (RRM) measurements As an embodiment based on the above selection criteria, transmission of another RAT may be sensed through performing of CCA with respect to a cell in which signal transmission of the corresponding LAA base station is not scheduled. In this case, a cell having a low CCA level may be selected, the corresponding cell may be occupied, and a beacon signal for reservation may be transmitted. Further, with respect to a cell of the corresponding LAA base station that is currently transmitted, a cell that is close to a transmission completion time may be selected, the corresponding channel may be occupied, and the successive transmission thereof may be immediately performed after completion of the previous other transmission without the beacon for transmission reservation.

A method for selecting target cells in accordance with the above-described criteria will be described with reference to FIG. 19A. In the case where the LAA base station determines that cell reselection is needed in cell 1 1900 that is a home cell and determines cell switching (1910), it may perform CCA with respect to cell 2 1903 that is a candidate cell since the cell 2 is a cell in which signal transmission of the corresponding LAA base station is not scheduled. Thereafter, since there is no transmission of another communication device in cell 2 1903 to satisfy the criteria, the LAA base station may select cell 2 1903 as the target cell, and thereafter, may transmit a cell reservation signal 1920 to cell 2 1903 for a cell movement delay time 1925 of the terminal.

The LAA base station may predict the cell movement delay time 1925 based on RF tuning delay information that is included in capability information of the terminal as described above, and may transmit the cell reservation signal. After transmitting the cell reservation signal 1920, the LAA base station may transmit the signal to the terminal (1930). The terminal may perform a synchronization process that includes RF returning, Automatic Gain Control (AGC) setting, and tracking using the reservation signal of the base station.

On the other hand, since cell 3 1906 that is a candidate cell is a cell in which the corresponding LAA base station currently performs signal transmission, the LAA base station determines whether the transmission completion time is near, and successively performs the transmission after completion of the previous transmission without transmitting separate CCA and reservation signal (1940). In this case, if the preceding residual transmission time is longer than the previous cell reservation signal length of cell 2 and is smaller than a predetermined value, the LAA base station can determine whether the transmission completion time is near (T_res <proceeding residual transmission time<T_res+ Beta). In such a situation, the synchronization process that includes RF returning, Automatic Gain Control (AGC) setting, and tracking can be performed using only Cell-specific Reference Signals (CRS) included in PDCCH and Demodulation Reference Signal (DMRS) included in a Physical Downlink Shared Channel (PDSCH).

Figure 20:
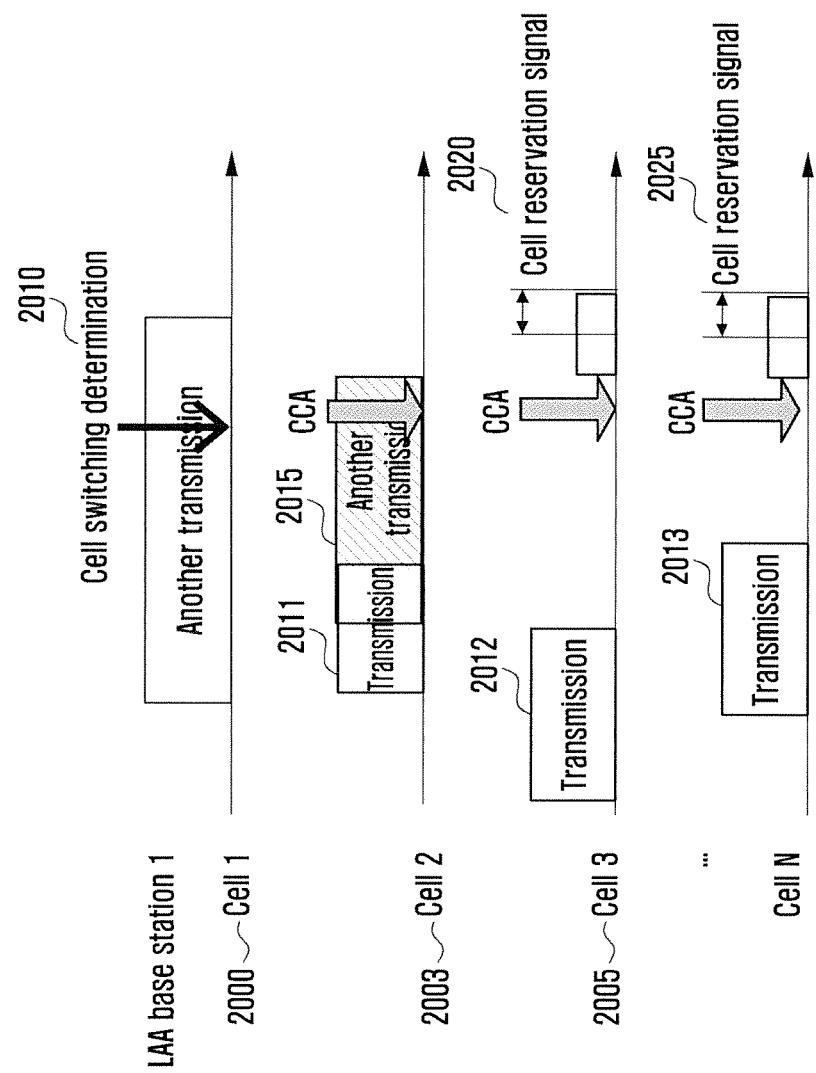
FIG. 20 is a diagram explaining transmission of Clear Channel Assessment (CCA) and reservation signals for a target cell through an LAA base station according to an embodiment of the present invention.

FIG. 20 is a diagram explaining transmission of Clear Channel Assessment (CCA) and reservation signals for a target cell through an LAA base station according to an embodiment of the present invention.

More specifically, FIG. 20 is to explain two methods for transmitting CCA and reservation signals with respect to a plurality of cells in the case of determining cell switching (2010) through satisfaction of cell reselection necessity requirements due to the reason for the existence of another transmission in cell 1 2000 that is a home cell of the LAA base station. First is an aggressive approach method. According to this method, CCA is performed with respect to a plurality of candidate cells, and a reservation signal, for example, reservation beacon, is transmitted simultaneously with the CCA. That is, the CCA is simultaneously performed with respect to cell 2 2003 to cell N 2007 (no_beacon=1, 2, . . . , Nc), and a final target cell can be selected among cells for which reservation has succeeded without collision as the result of the CCA. The method for selecting the final target cell may be based on at least one of those as described above with reference to FIG. 19A.

Second is an opportunistic approach method. According to this method, CCA is performed with respect to one of the plurality of candidate cells, and a reservation signal is transmitted. If the reservation has failed due to collision or the like, the CCA may be successively performed with respect to another cell among the candidate cells, and a reservation signal may be transmitted.

Figure 21:
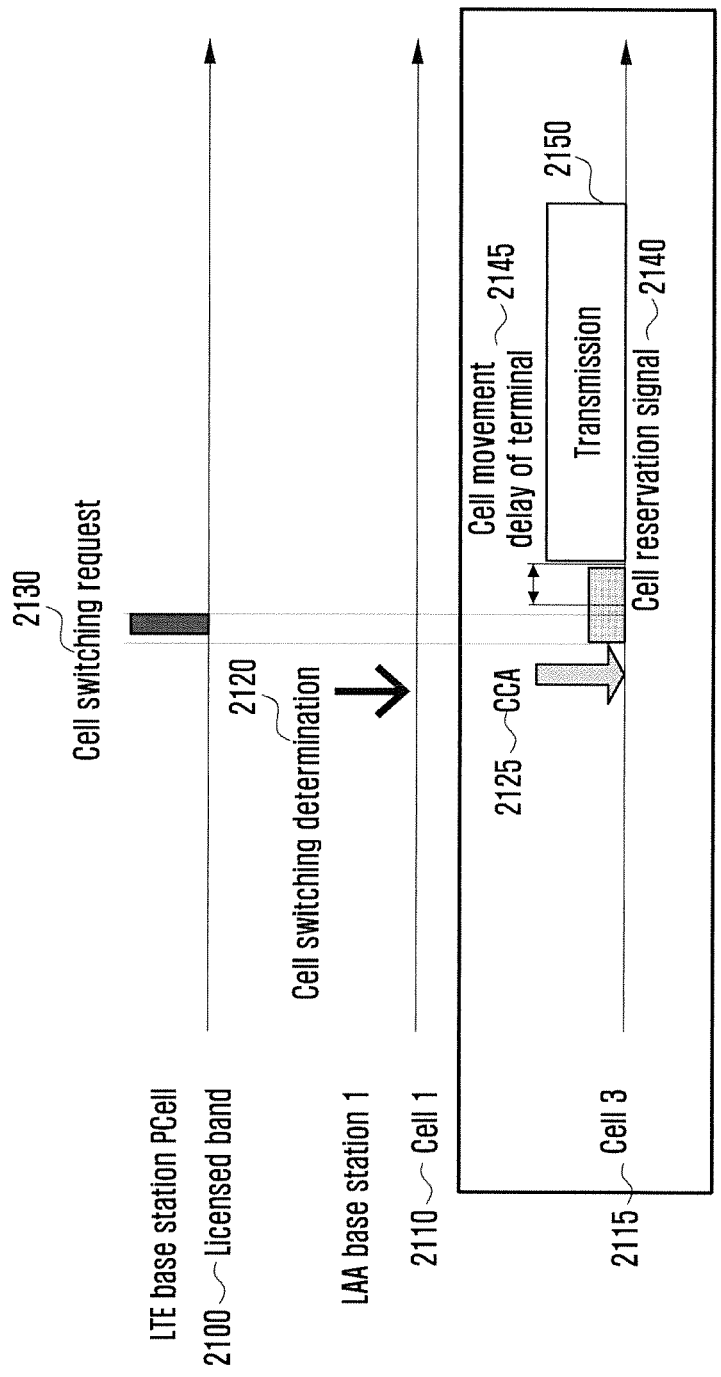
FIG. 21 is a diagram explaining transmission of a cell switching request message through an LTE base station according to an embodiment of the present invention.

FIG. 21 is a diagram explaining transmission of a cell switching request message through an LTE base station according to an embodiment of the present invention.

More specifically, in the case where the LAA base station determines cell switching (2120), CCA is performed with respect to cell 3 2115, and if the cell 3 is determined as a target cell, a cell switching request message 2130 is transmitted from a PCell of a licensed band 2100 of the LIE base station through PDCCH, and a cell reservation signal 2140 is immediately transmitted with respect to cell 3 2115. The transmission time of the cell reservation signal may be determined based on a cell movement delay time 2145 of the terminal. As described above, if the terminal that has received the cell switching request message 2130 performs the cell switching after precedent cell occupation using the cell reservation signal 2140 of the LAA base station, the cell switching request message is transmitted in a licensed band, and thus uncertainty can be removed with reduction of the change delay time through transmission of the PDCCH (for each subframe).

Figure 22:
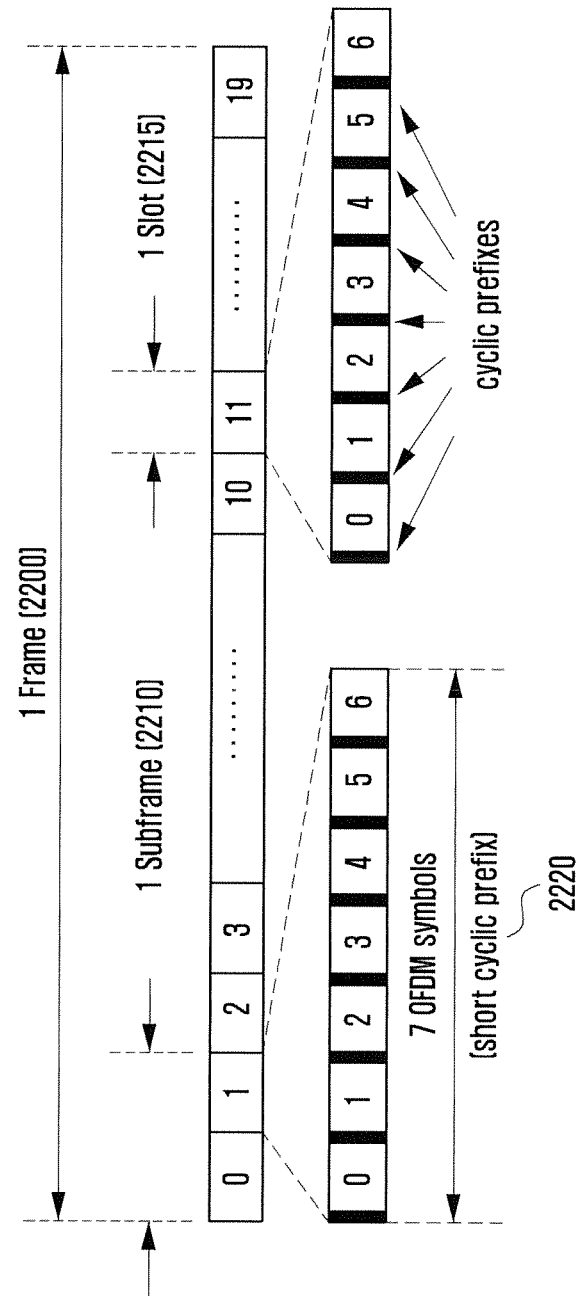
FIG. 22 is a diagram explaining a time overhead when an LTE base station transmits a cell switching request message according to an embodiment of the present invention.

FIG. 22 is a diagram explaining a time overhead when an LTE base station transmits a cell switching request message according to an embodiment of the present invention.

More specifically, FIG. 22 is to explain calculation of a delay time in the case where the cell switching request message according to the present invention is transmitted through L1 signaling in a PDCCH.

First, the frame structure in an LTE communication system will be described. One frame 2200 corresponds to 10 m, and one subframe 2210 corresponds to =1 ms. Further, one slot 2215 corresponds to 0.5 ms, and one symbol 2220 corresponds to 71.3 µs.

Since a cell switching command of a terminal is received through the PDCCH, time is consumed within three symbols. Thereafter, if it is assumed that the cell movement time is equal to or shorter than 100 µs in average, the sum of the time for receiving the cell switching command and the cell movement time is maximally equal to or shorter than 6 symbols (i.e., 0.45 ms)

Figure 23:
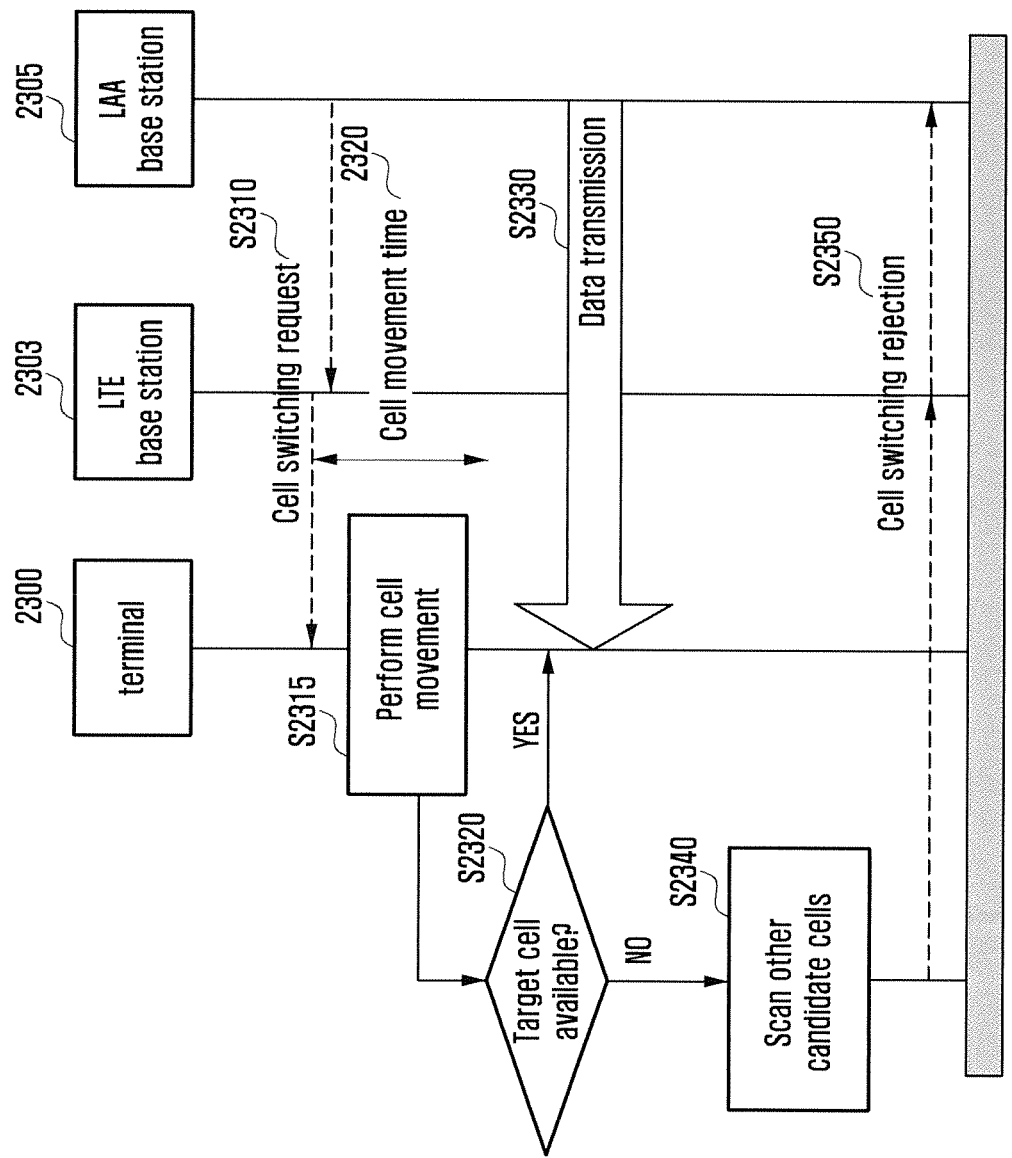
FIG. 23 is a diagram explaining operations of a terminal, an LTE base station, and an LAA base station to transmit and receive a cell switching request message and a cell switching rejection message in response to the cell switching request message according to an embodiment of the present invention.

FIG. 23 is a diagram explaining operations of a terminal, an LTE base station, and an LAA base station to transmit and receive a cell switching request message and a cell switching rejection message in response to the cell switching request message according to an embodiment of the present invention.

An LAA base station 2305 may transmit a cell switching request message to a terminal 2300 through an LTE base station 2303 (S2310). The terminal 2300 may perform cell movement in response to the cell switching request message.

Thereafter, the terminal 2300 may determine whether the target cell is available (S2320). That is, the terminal may determine whether the target cell is available through monitoring of the cell, and in this case, may monitor channel state information of a serving cell and Received Signal Strength Indicator (RSSI) of the received signal levels (including WiFi interference) of all neighboring cells during an RRM measurement operation. In the case where the terminal provides feedback of the target cell state after the cell movement, the terminal measures a channel after RF tuning to the target cell, determines that the target cell is available if the value of a neighboring signal is equal to or smaller than a threshold value, configures the indicator of a cell switching rejection message as "0", and does not transmit the cell switching rejection message. Since the cell switching rejection message may not received, the LAA base station may perform downlink transmission to the target cell at a scheduled time. Thereafter, the LAA base station 2305 may transmit data to the terminal 2300 (S2330).

If the quality of the target cell deteriorates, that is, if the neighboring interference signal value is equal to or larger than the threshold value, after the cell movement is performed, the terminal 2300 may scan other candidate cells (S 2340). In the case of scanning a new target cell, the terminal may perform a scanning operation with respect to all the candidate cells that are configured through the RRC reconfiguration message. Further, the terminal may perform a scanning operation with respect to limited candidate cells that are recommended by the LAA base station. Thereafter, the terminal may finally determine the target cell after selective scanning of the candidate cells. That is, the terminal may finally determine whether the target cell is suitable after scanning of the candidate cells. The terminal may confirm whether reception Signal-to-Interference-plus-Noise Ratio (SINR) of the target cell is equal to or higher than a predetermined threshold value. The reception SINR may be determined on the basis of the reservation signal reception level in the target cell or the reception level in the data frame of the previous transmission. Thereafter, the terminal 2330 may transmit a cell switching rejection message to the LAA base station 2305 (S2350).

The cell switching rejection message may be transmitted to the LAA base station through Physical Uplink Control Channel (PUCCH), Physical Random Access Channel (PRACH), and special PUCCH. The cell switching rejection message may selectively include information on the cell that is determined as the target cell among the scanned candidate cells. In the case where the cell switching rejection message is transmitted through the PUCCH, the target cell may be allocated to the corresponding terminal that has transmitted the message. Further, in the case where the cell switching rejection message is transmitted through the PRACH, the target cell may be dynamically allocated to the terminal, if needed, under the determination of the base station. Further, in the case where the cell switching rejection message is transmitted through the special PUCCH, the target cell may be allocated to the terminal in a competitive manner based on the PUCCH.

Hereinafter, technically featured processes of a cell switching method in an unlicensed band as described above will be described in more detail with reference to FIGS. 24 to 29B.

Figure 24:
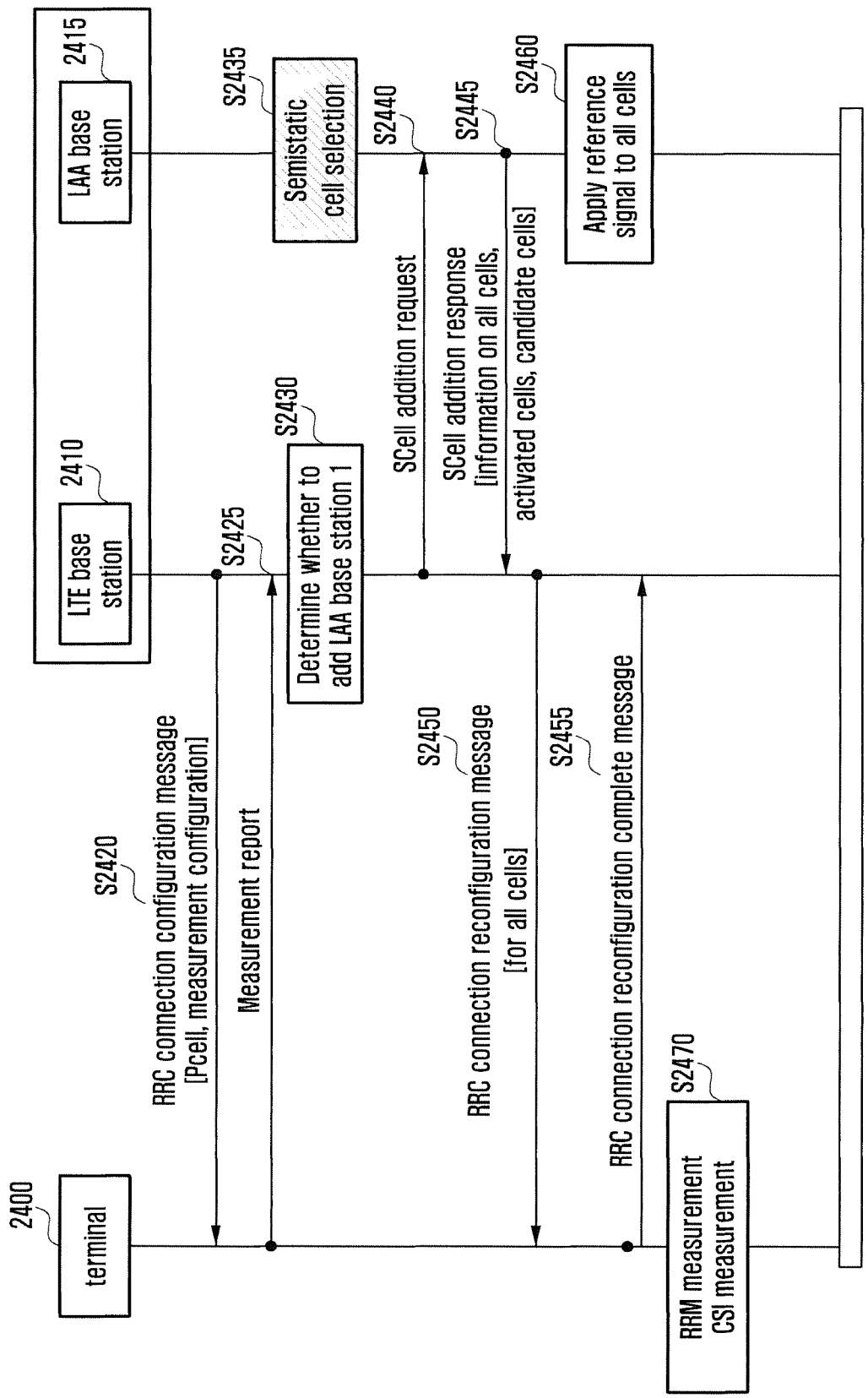
FIG. 24 is a diagram explaining operations of a terminal, an LTE base station, and an LAA base station for cell configuration and cell measurement with respect to the terminal according to an embodiment of the present invention.

FIG. 24 is a diagram explaining operations of a terminal, an LTE base station, and an LAA base station for cell configuration and cell measurement with respect to the terminal according to an embodiment of the present invention.

More specifically, FIG. 24 is to materialize RRC configuration at operation S320 in FIG. 3.

An LTE base station 2410 may transmit an RRC connection configuration message to a terminal 2400 (S2420). The RRC connection configuration message may include information on a Primary (P) cell of the LTE base station and configuration information that is required for cell measurement of the terminal. The configuration information that is required for the cell measurement of the terminal may include at least one of an RRM measurement period and a CSI measurement period. The configuration information that is required for the cell measurement may include information on the LAA base station. The terminal 2400 may perform cell measurement on the basis of the configuration information, and then may determine whether to add the LAA base station 2415 on the basis of the measurement report (S2430). The LAA base station 2415 may make semistatic cell selection (S2435).

Thereafter, in the case where the LTE base station 2410 has determined to add the LAA base station 2415, it may transmit a Secondary (S) Cell addition request message to the LAA base station 2415 (S2440). The LAA base station 2415 may transmit a SCell addition response message to the LTE base station 2410 (S2445). The SCell addition response message may include information on all added cells and information on activated cells and candidate cells. The activated cells are cells for transmitting data. The candidate cells are cells which are currently in an inactivated state, but become targets for switching when the cell switching request is received from the LAA base station later. In addition, cells which are inactivated and are not included in the candidate cells are called inactivated cells. The LTE base station 2410 may transmit an RRC connection reconfiguration message for all the added cells to the terminal (S2450).

The RRC connection configuration message may include transmission formats for respective cells and measurement configuration information on the activated cells and the candidate cells. The terminal 2400 may transmit an RRC connection reconfiguration complete message to the LTE base station 2410 (S2455). The LAA base station 2415 may transmit a reference signal for all the cells (S2460). Thereafter, the terminal 2400 may perform at least one of Radio Resource Management (RRM) measurement and Channel Status Information (CSI) measurement (S2470).

The method as described above with reference to FIG. 24 is to configure the cells the number of which is larger than the number of RF capabilities of the terminal, and according to the method, the LTE base station that is a Master e-Node B (MeNB) configures all constituent cells of the serving base station for the terminal. This corresponds to an operation for fast carrier selection afterward, and can reduce the delay that is caused by the RRC connection (re)configuration afterward.

Figure 25A:
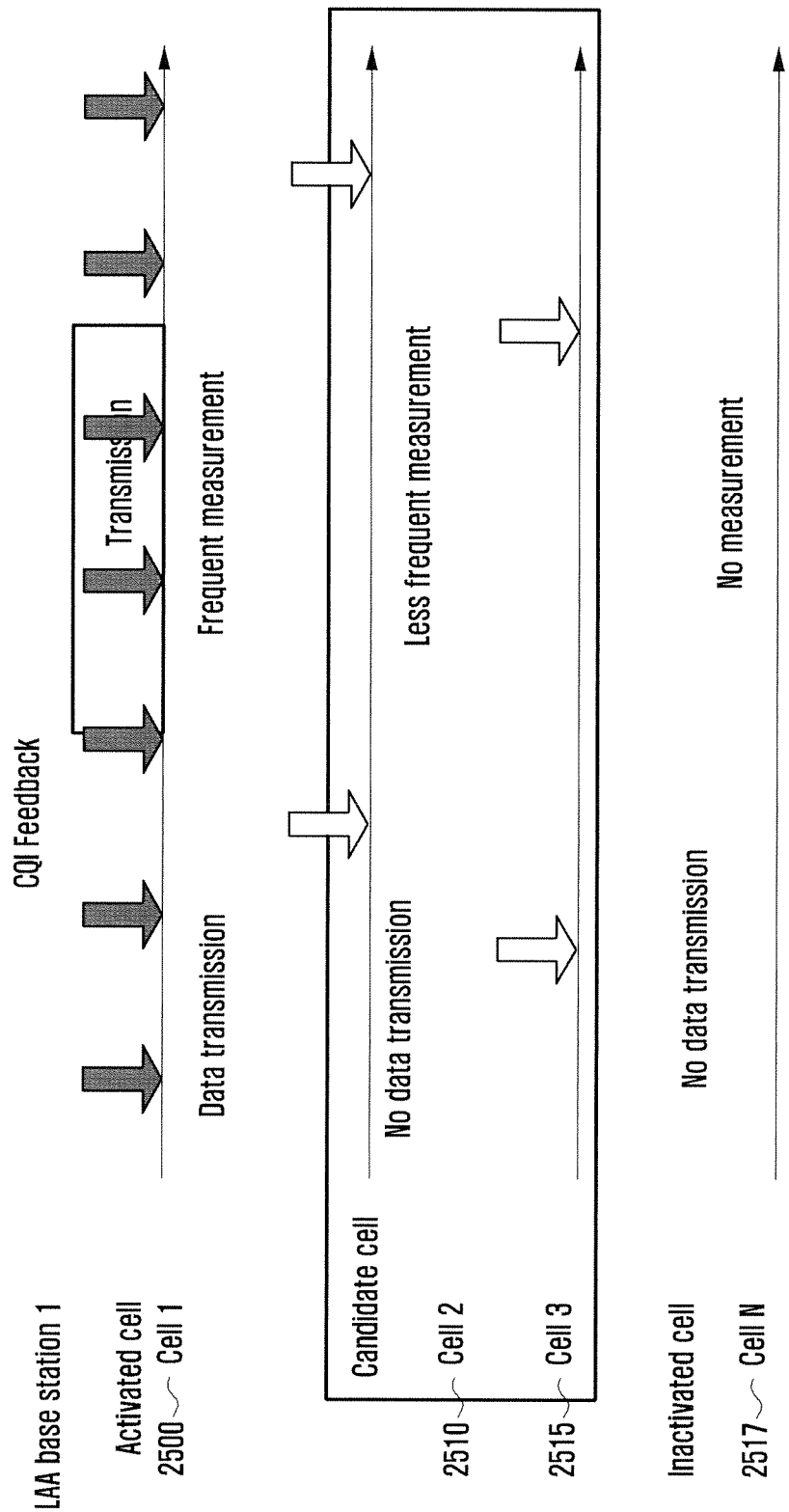
FIGS. 25A and 25B are diagrams explaining Radio Resource Management (RRM) and CSI measurement of a terminal according to an embodiment of the present invention.
Figure 25B:
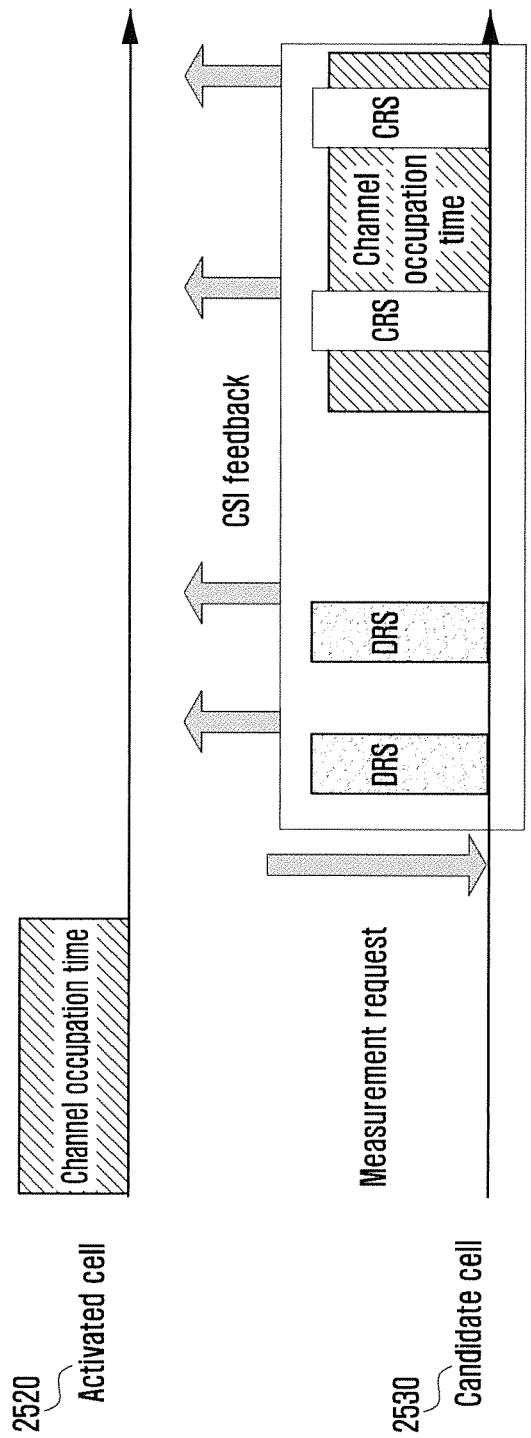

FIGS. 25A and 25B are diagrams explaining Radio Resource Management (RRM) and CSI measurement of a terminal according to an embodiment of the present invention.

More specifically, FIG. 25A is to explain S2470 of FIG. 24 in detail.

As described above, a terminal may receive measurement configuration information for all cells from an LIE base station through an RRC connection reconfiguration message. More specifically, the measurement configuration information for all cells included in the RRC connection reconfiguration message is based on measurement configuration information included in a SCell addition response message that is transmitted by an LAA base station. That is, through operations S2445 and S2450 of FIG. 24, the terminal may receive the measurement configuration information.

The measurement configuration information may include whether to perform CSI measurement and CSI measurement period information in addition to the RRM measurement period for the corresponding cell. Such a CSI measurement operation may be performed in an event-driven manner in which the terminal requests the CSI measurement through periodic measurement defined in the RRC configuration and base station request (L1 signaling). Further, the baseline is to receive only terminal CRS and to perform CSI measurement. However, if a CSI indication field is "1" in the RRC configuration or L1 signaling, it is confirmed that the base station transmits up to CSI-RS in addition to the CRS, and based on this, the terminal may operate to receive the CRS and the CSI-RS, to measure the CSI, and to transmit the measured CSI to the base station. In order to receive the L1 signaling, the terminal may monitor the base station signal (e.g., CRS or PDCCH information) in a specific position.

The all cells as described above may include activated cells and candidate cells as the cells of the LAA base station. The LAA base station may configure the cells so that the measurement frequency of the activated cells becomes higher than the measurement frequency of the candidate cells. The measurement operation of the terminal in accordance with the above-described configuration is exemplarily illustrated in FIG. 25A. That is, in cell 1 2500 that is an activated cell in which data transmission exists, CQI feedback through frequency measurement is transmitted, but in the case of cell 2 2510 and cell 3 2515, which are candidate cells in which data transmission does not exist, less frequent measurement is performed. In contrast, in the case of the inactivated cell in which data transmission does not exist (2517), the measurement is not performed.

FIG. 25B is to explain the operation of the terminal in the activated cell and the candidate cell.

The terminal may receive data from the activated cell 2520. For this, the terminal may monitor the PDCCH, and may perform the cell measurement. Further, in a candidate cell 2530, measurement can be performed. Although not illustrated, in an inactivated cell, the measurement is not performed, but only RRC configuration information can be shared. FIG. 25B is to materialize the measurement operation in the candidate cell 2530, and this may be applied to the activated cell 2520 in the same manner. After receiving a CSI measurement request, the terminal may receive a reference signal. The reference signal may include at least one of a CSI Reference Signal (CSI-RS), a Dedicated-Reference Signal (DRS), and a Cell-Reference Signal (CRS). The terminal may transmit a CSI feedback on the basis of the reference signal. A method for transmitting a CSI feedback on the basis of the reference signal is as described above with reference to FIG. 25A. Further, the terminal may preferentially perform the operation for the activated cell when the sum of the number of activated cells and the number of candidate cells becomes equal to or higher than the RF capability of the terminal.

Figure 26:
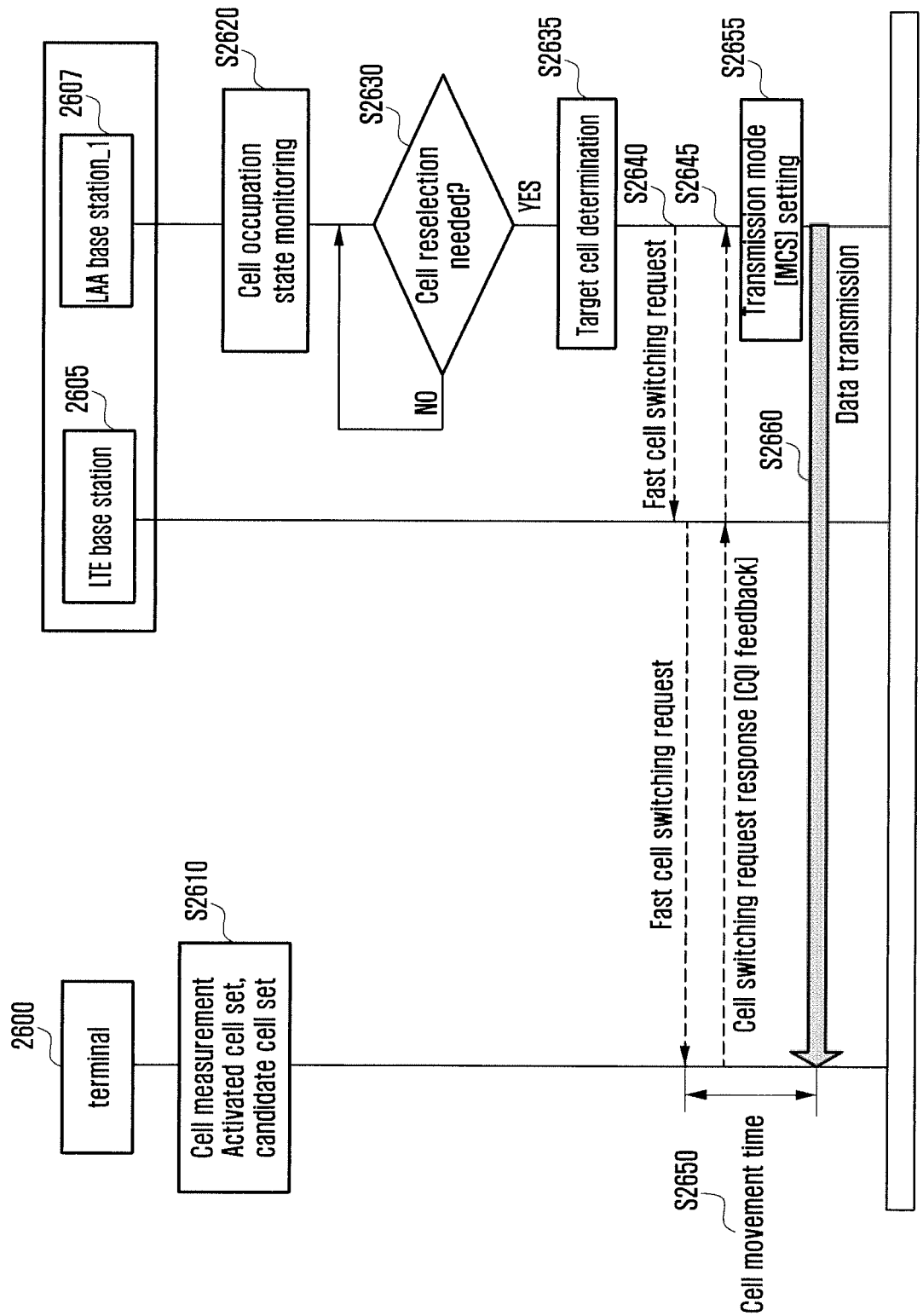
FIG. 26 is a diagram materializing operations of a terminal, an LIE base station, and an LAA base station for cell selection according to an embodiment of the present invention.

FIG. 26 is a diagram materializing operations of a terminal, an LIE base station, and an LAA base station for cell selection according to an embodiment of the present invention.

More specifically, according to the present invention, a terminal switches an activated cell on the basis of a cell switching request message of an LAA base station, and in particular, the terminal transmits the cell switching request message using L1 signaling.

More specifically, FIG. 26 is to explain the operation of an LAA base station 2607 after a plurality of cells that get over the RF capability of the terminal are configured to the terminal as described above using an RRC configuration message and a MAC-CE. Thereafter, the terminal 2600 may perform cell measurement with respect to an activated cell set and a candidate cell set. The LAA base station 2607 may monitor a cell occupation state (S2620). Thereafter, the LAA base station 2607 may determine whether cell reselection is needed (S2630).

Thereafter, if cell reselection is needed since the operation in the current home cell cannot be occupied or occupation in future time is impossible, the LAA base station 2607 may determine the best target cell for the terminal 2600 (S2635). If the target cell is determined, the LAA base station 2607 may transmit a cell switching request message for the target cell to the corresponding terminal 2600 (S2640). In particular, transmission of the cell switching request message through PDCCH signaling in a PCell of an LTE base station in a licensed band or a serving cell of the LAA base station may be called a fast cell selection.

In transmitting the cell switching request message, since it is not yet possible for the corresponding terminal to directly allocate transmission resources to the target cell in an unlicensed band, a PCell of the LTE base station or a serving cell of the LAA base station, which is currently connected, may transmit the cell switching request message. The cell switching request message may include information on a home cell, information on a target cell for movement, whether to receive PDCCH, whether to measure CSI, whether to receive CSI-RS, center frequency information, bandwidth information, and information on transmission power. Further, the cell switching request message may selectively include data transmission start time information or home channel information and information on a home channel return timer. The information on whether to receive the PDCCH is information on whether activation of the corresponding cell is to simply measure RRM and CSI (PDCCH reception is not needed) or to receive data traffic (PDCCH reception is needed). Whether to measure the CSI may be performed in an event-driven manner in which the terminal requests the CSI measurement through periodic measurement defined in the RRC configuration and base station request (L1 signaling). The baseline of whether to receive the CSI-RS is to receive only terminal CRS and to perform CSI measurement. However, if a CSI indication field is "1" in the RRC configuration or L1 signaling, it is confirmed that the base station transmits up to CSI-RS in addition to the CRS, and based on this, the terminal may operate to receive the CRS and the CSI-RS, to measure the CSI, and to transmit the measured CSI to the base station. In order to receive the L1 signaling, the terminal should monitor a base station signal (e.g., CRS or PDCCH information) in a specific position. The above-described information is merely exemplary, and information that is included in the cell switching request message is not limited thereto.

Thereafter, the terminal 2600 may perform cell movement to a target cell (S2650). Thereafter, if the cell movement is completed and a response message that includes CQI feedback of the target cell for the cell switching request is transmitted (S2645), the LAA base station 2607 may be set to a transmission mode, that is, Modulation and Coding Scheme (MSC) (S2655). Thereafter, the LAA base station 2607 may transmit data to the terminal 2600 (S2660).

Figure 27A:
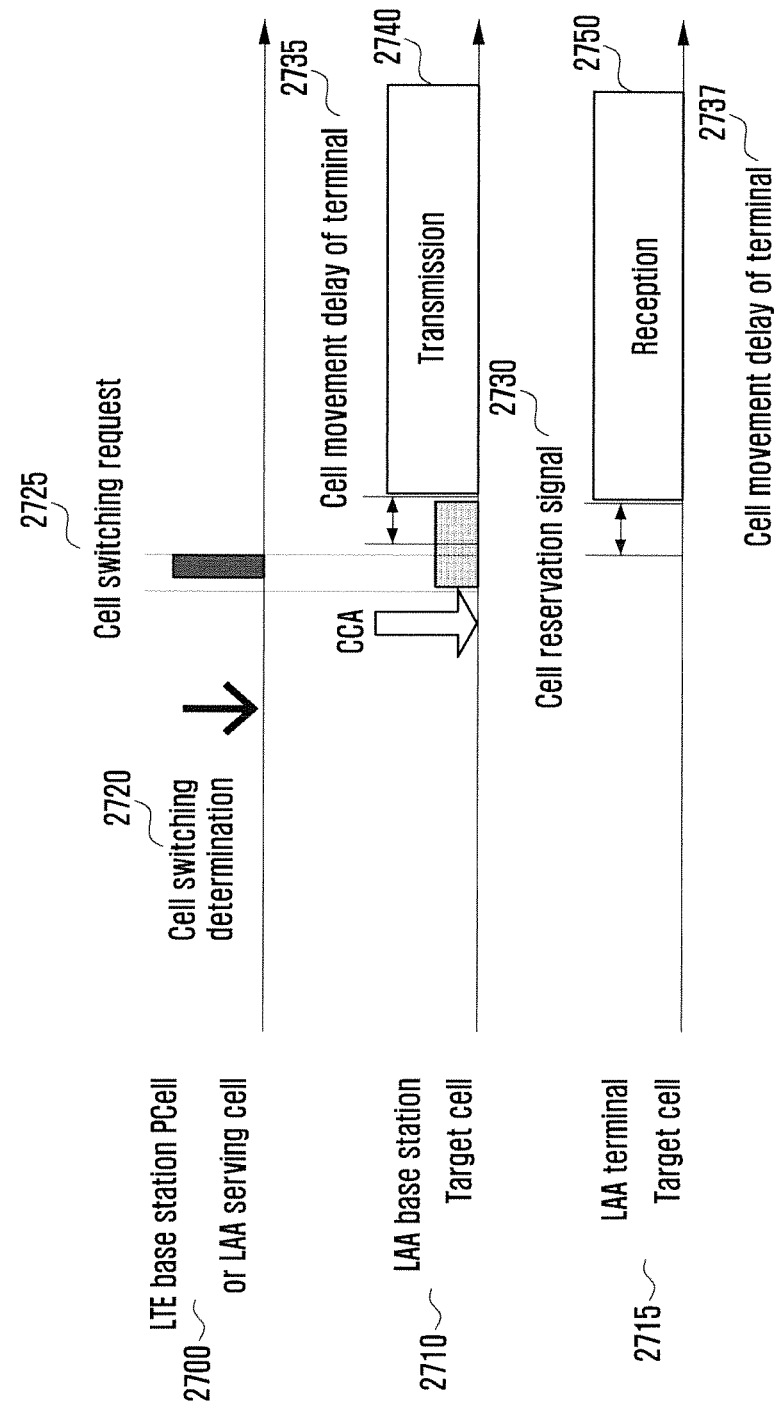
FIGS. 27A and 27B are diagrams explaining transmission and reception operations of an LAA base station and an LAA terminal in a target cell in accordance with transmission of a cell switching request message according to an embodiment of the present invention.
Figure 27B:
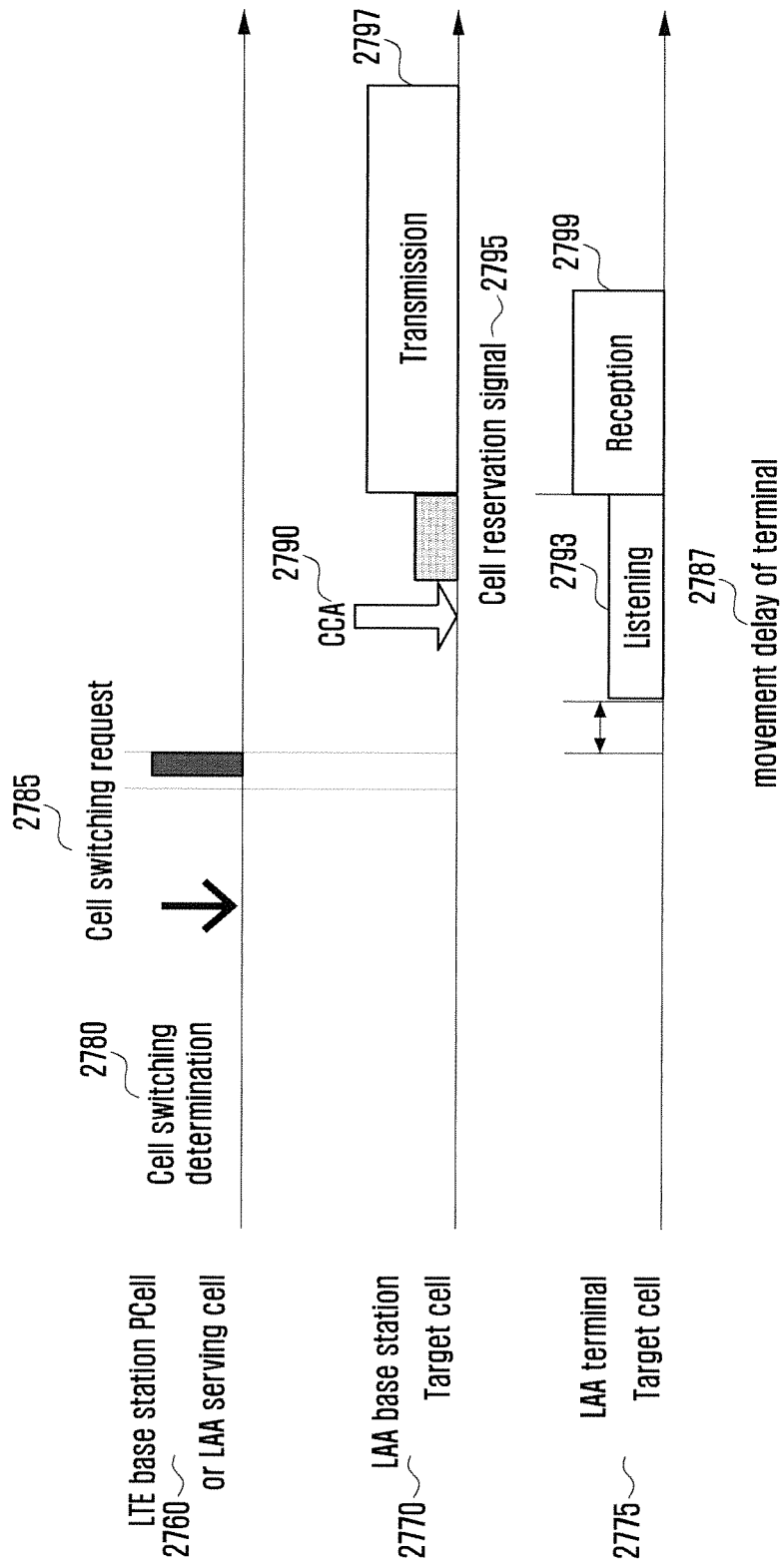

FIGS. 27A and 27B are diagrams explaining transmission and reception operations of an LAA base station and an LAA terminal in a target cell in accordance with transmission of a cell switching request message according to an embodiment of the present invention.

More specifically, FIGS. 27A and 27B illustrate two embodiments in which it is determined, after transmitting a cell switching request message to a terminal, whether an LAA base station transmits data after the terminal first moves or transmits a reservation signal before the terminal moves.

FIG. 27A illustrates an embodiment in which the base station first transmits a reservation signal before the terminal moves to a target cell. If cell switching is determined in an LAA serving cell (or home cell) 2700 (2720), the cell switching request message may be transmitted from a PCell of the LTE base station or the LAA serving cell 2700 to the terminal. The LAA base station 2710 may confirm channel occupation of the target cell, to which the terminal will move, through precedent occupation of the target cell as long as a cell delay time 2735 of the terminal through a cell reservation signal 2730 after CCA. In contrast, since the terminal moves to the target cell 2715 afterward to cause a cell movement delay 2737 of the terminal, the terminal may receive a part of the reservation signal for LAA base station channel occupation and subframe boundary matching. Accordingly, the terminal can perform transmission using a long-term RRM measurement without CQI feedback. Thereafter, the terminal may start reception of PDCCH to match the time boundary of the subframe (2750). With respect to the first subframe, the LAA base station transmits data through determination of MCS based on the long-term RRM measurement (2740).

FIG. 27B illustrates an embodiment in which the base station transmits a reservation signal and data after the terminal moves to a target cell. If cell switching is determined in an LAA serving cell (or home cell) 2760 (2720), the cell switching request message may be transmitted from a PCell of the LTE base station or the LAA serving cell 2760 to the terminal. According to this method, the terminal first moves to the target cell 2775. The LAA base station may perform CCA with respect to the target cell 2770 after a cell switching request message 2785 is transmitted, and may transmit a reservation signal 2795. Further, the terminal can receive the reservation signal for base station subframe boundary matching in the target cell 2775, and can transmit a short-term Channel Quality Indicator (CQI) feedback using the reservation signal to an LIE air or LAA uplink.

The terminal can perform monitoring after movement to the target cell. In a state where the base station has not yet occupied resources and thus has not yet sent the reservation signal, the terminal may successively sense reception of the reservation signal. For synchronization, the base station may send PSS/SSS to the reservation signal. In order to discriminate the first subframe that is transmitted by the base station after reception of the reservation signal, the terminal can monitor and receive CRS, and thus can receive data 2797 that is transmitted by the LAA base station in the target cell 2775 to match the subframe (2799). Through this, Channel Occupation Time (COT) of the LAA base station can be saved. Further, the LAA base station may determine MCS based on the CQI feedback from the first subframe on the basis of the CQI feedback transmitted by the terminal through reception of preamble in the reservation signal, and may transmit the data.

The terminal can perform monitoring after movement to the target cell. In a state where the base station is sending or has sent the reservation signal through occupation of the resources, the terminal can immediately monitor the Cell-Reference Signal (CRS) without monitoring the reservation signal. The base station can additionally send, to the terminal, information for indicating whether the terminal monitors the reservation signal or the CRS when indicating that the terminal performs target cell movement. Further, the base station may use information for notifying whether to receive PDCCH, which is sent together when the base station indicates the target cell movement, in discriminating monitoring of the reservation signal or the CRS. That is, in the case of indicating that the terminal receives the PDCCH, the base station makes the terminal immediately monitor the CRS without monitoring the reservation signal, whereas in the case of indicating that the terminal does not receive the PDCCH, the base station makes the terminal monitor the reservation signal first. The CRS monitoring operation as described above may be replaced by the PDCCH or EPDCCH monitoring operation in the case where the terminal has already been allocated with a certain subframe from the PCell.

Figure 28:
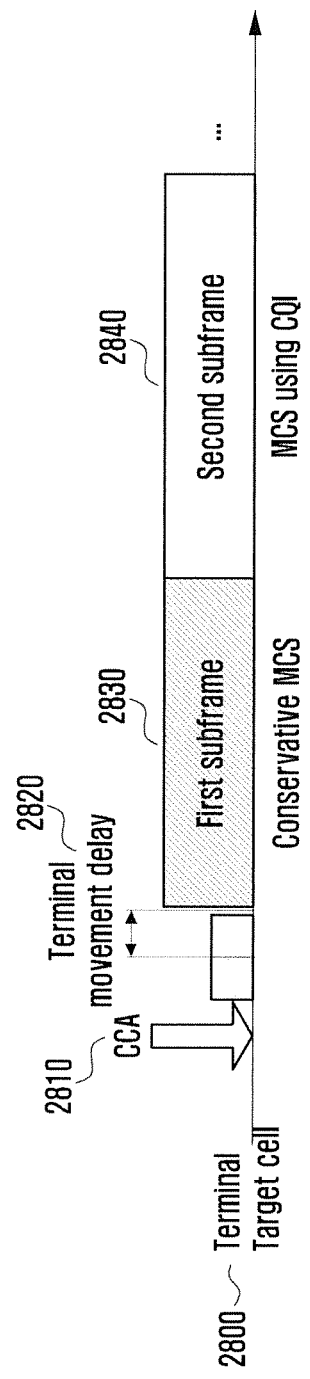
FIG. 28 is a diagram explaining a method for determining Modulation and Coding Scheme (MCS) of a terminal according to an embodiment of the present invention.

FIG. 28 is a diagram explaining a method for determining Modulation and Coding Scheme (MCS) of a terminal according to an embodiment of the present invention.

More specifically, FIG. 28 illustrates an embodiment in which the base station first transmits the reservation signal before the terminal as described above with reference to FIG. 27A moves to the target cell, and is to explain a method for determining the MCS of the LAA base station.

In the case where the LAA base station transmits the reservation signal just after CCA 2810 of the LAA base station in the target cell of the terminal 2800 and terminal movement delay time 2820 occurs, the terminal can listen to only a part of preamble that is included in the reservation signal, and thus transmission of short-term CQI feedback is not possible. In this case, the LAA base station may use a conservative MCS determination method with respect to the first subframe 2830, and may use an MCS determination method using CQI feedback with respect to the second subframe 2840 and so on. More specifically, the conservative MCS determination method means an MCS determination method based on the long-term RRM measurement of the existing terminal.

Further, although not illustrated in the drawing, in the case of an embodiment in which the base station transmits the reservation signal and data after the terminal as described above with reference to FIG. 27B moves to the target cell, the terminal can receive the reservation signal for base station subframe boundary matching in the target cell 2775, and thus short-term Channel Quality Indicator (CQI) feedback using the reservation signal becomes possible. Accordingly, the MCS can be determined on the basis of the CQI feedback from the first subframe, and the data can be transmitted.

Figure 29A:
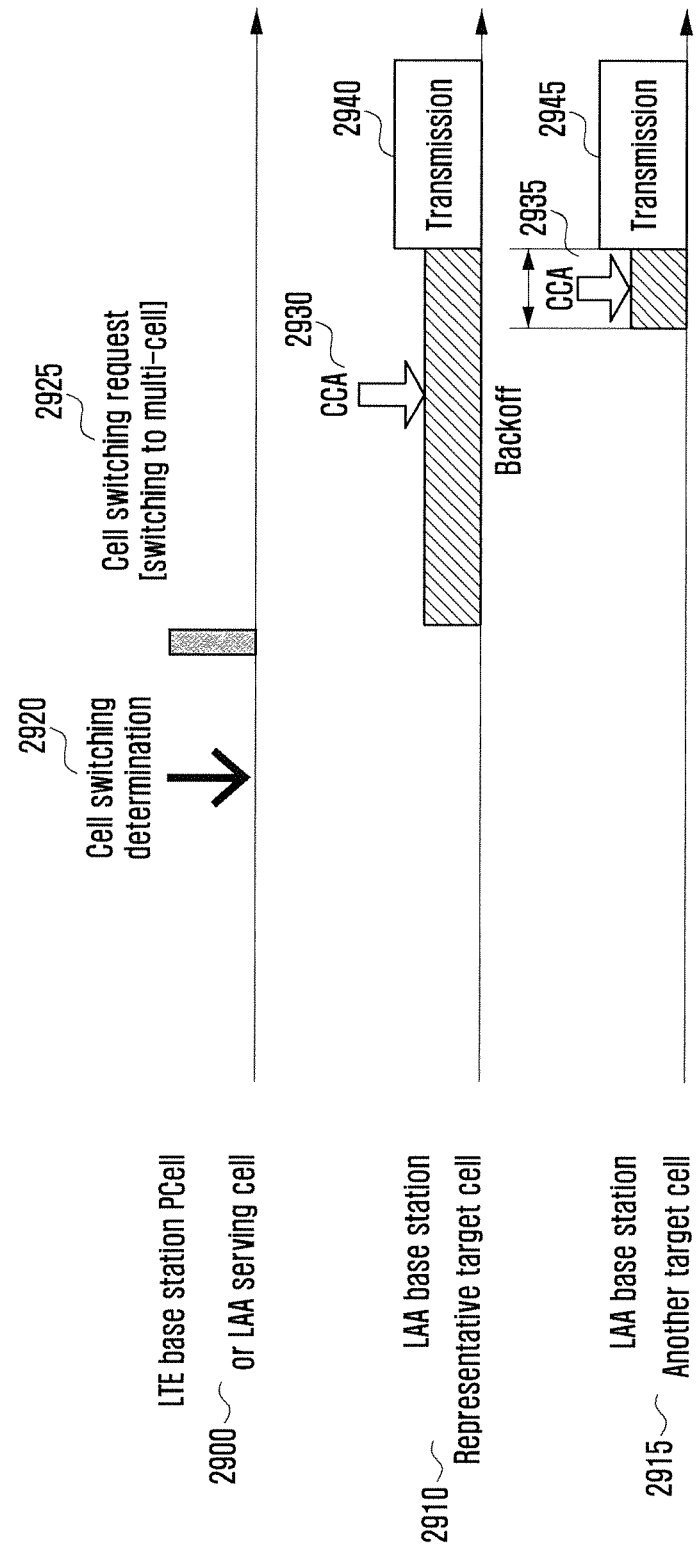
FIGS. 29A and 29B are diagrams explaining a multi-cell switching method according to an embodiment of the present invention.
Figure 29B:
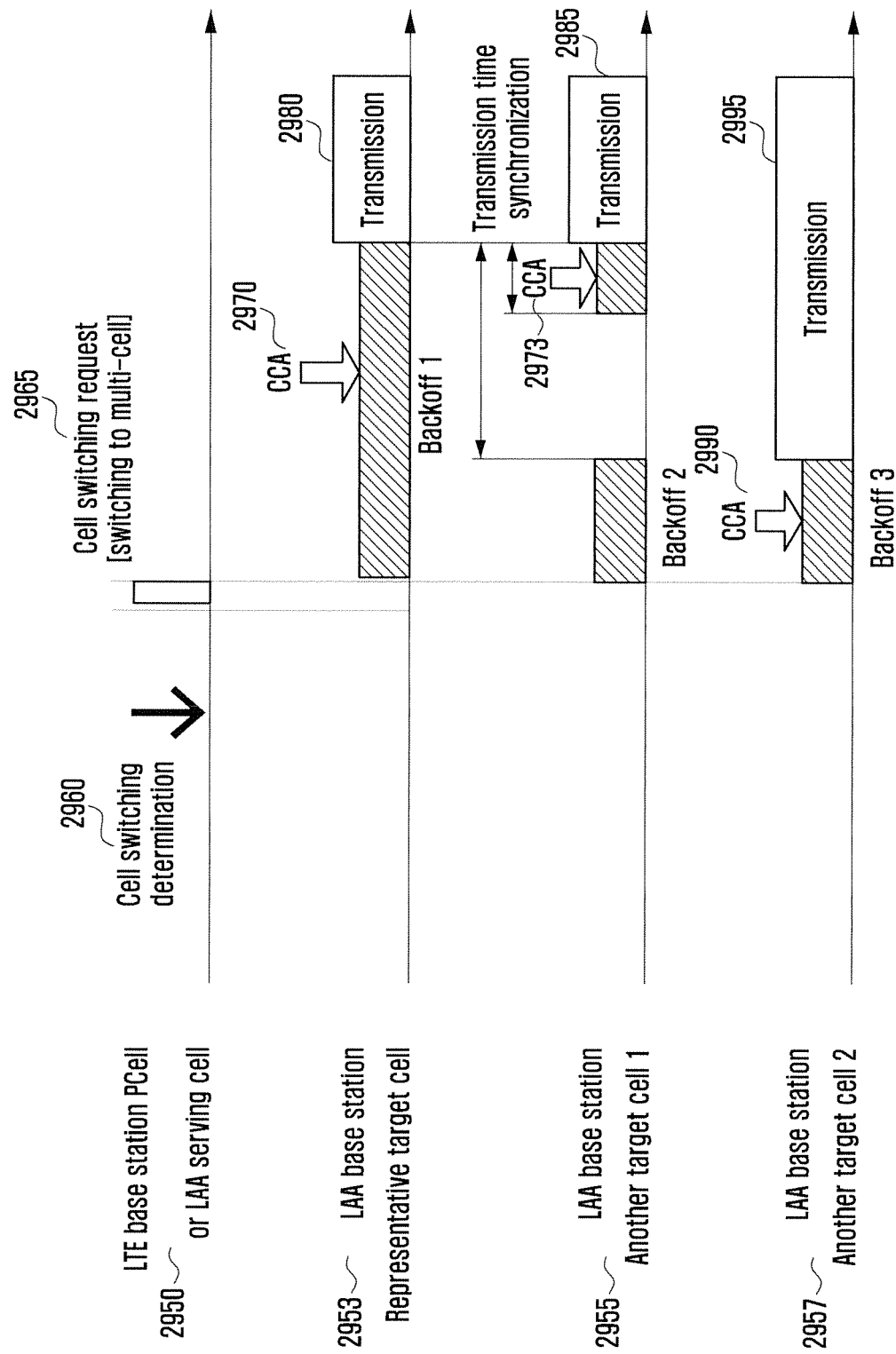

FIGS. 29A and 29B are diagrams explaining a multi-cell switching method according to an embodiment of the present invention.

More specifically, FIGS. 29A and 29B are to explain a multi-cell switching method of a terminal through indication by a base station. According to this method, a plurality of cell bundles are simultaneously selected and switched, and thus signal overhead and cell movement delay reduction effects can be obtained. In this case, cell (carrier) bundles for a plurality of cells may be indicated using Lookup Table (LUT) index transmission of a combination of predetermined cells or explicit inscription on a fast cell switching request message through the PDCCH.

FIG. 29A shows that the cell bundles for the plurality of cells are indicated by a LUT index transmission method of a combination of a plurality of predetermined cells. In the case of cell switching determination in an LAA serving cell (or home cell) 2900 (2920), a cell switching request message 2925 may be transmitted from a PCell of an LIE base station or the LAA serving cell 2900 to the terminal. The cell switching request message 2925 is to request switching to the plurality of cells, and may include the LUT index information of a combination of the plurality of predetermined cells.

Thereafter, in target cell 1 2910 that corresponds to a representative cell of the LAA base station, LBT may be performed for a backoff time for cell occupation for the backoff time (3030). Another target cell 2 2915 in a cell bundle that is configured by the LUT index information may be transmitted after performing CCA in a predetermined section (i.e., Point Coordination Function (PCF) Interframe Space (PIFS)) just before backoff completion of the representative cell. Thereafter, data can be transmitted in the cell in which the CCA has succeeded (2940 and 2945).

FIG. 29B is to explain explicit inscription on a fast cell switching request message through PDCCH.

In the case of cell switching determination in an LAA serving cell (or home cell) 2950 (2960), a cell switching request message 2965 may be transmitted from a PCell of an LTE base station or the LAA serving cell 2950 to the terminal. In this case, cell information on a plurality of cell bundles is explicitly inscribed in the cell switching request message 2965. A representative target cell 2953 of the LAA base station may perform LBT during a backoff time for cell occupation. In the case of another cell that is not the representative cell in a cell bundle group, independent LBT is performed, and if a gap between the representative cell and the corresponding cell is equal to or smaller than a threshold value, the transmission time may be transmitted in synchronization with the representative cell at the largest backoff time (2980 and 2985). In this case, in the case of target cell 2-1 2955 in which the gap between the representative cell and the corresponding cell is equal to or smaller than the threshold value, data can be transmitted after CCA is performed (2973) for a predetermined section (i.e., PIFS).

On the other hand, in the case of a target cell 2957 in which the gap between the representative cell 2953 and the target cell is equal to or larger than the threshold value, transmission can start without synchronization in the cells in which LBT has succeeded.

Figure 30:
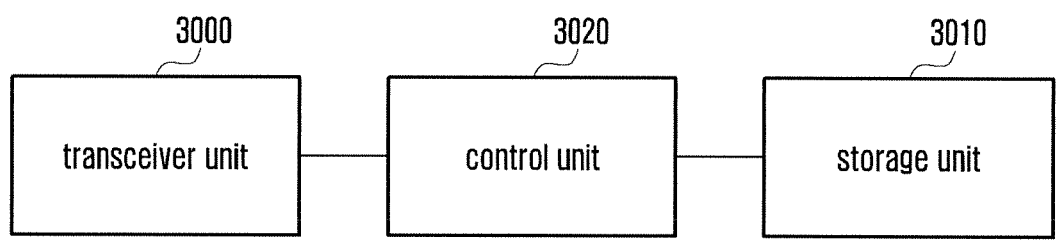
FIG. 30 is a block diagram illustrating the internal configuration of a base station according to an embodiment of the present invention.

FIG. 30 is a block diagram illustrating the internal configuration of a base station according to an embodiment of the present invention.

More specifically, the base station may include a transceiver unit 3000, a storage unit 3010, and a control unit 3020.

The transceiver unit 3000 may transmit and receive signals for operations according to the present invention. Further, the transceiver unit 3000 may operate in frequencies of a licensed band and an unlicensed band. The transceiver unit 3000 may include an LTE communication module that operates in the frequency of the licensed band. Further, the transceiver unit 3000 may include an LAA communication module and a WiFi communication module that operate in the frequency of the unlicensed band. FIG. 30 illustrates a configuration that includes the LTE communication module, the LAA communication module, and the WiFi communication module in a physically single base station. However, it is apparent to those of ordinary skill in the art to which the present invention pertains that the present invention can be applied even to an embodiment in which the communication modules are respectively installed in physically separate base stations that are connected to each other.

The storage unit 3010 may store therein information that is required for the operation of the base station according to the present invention. The storage unit 3010 may receive information that is received from the transceiver unit 3000 from the control unit 3030, and may store the received information therein.

The control unit 3020 may operate to connect with a terminal through a first cell in a licensed band, to transmit a message for configuring a plurality of second cells in an unlicensed band to the terminal through the first cell, and to monitor the plurality of the configured second cells in the unlicensed band. The number of the second cells exceeds the number of cells that can support Carrier Aggregation (CA) of the terminal.

The control unit 3020 may operate to transmit an extended Medium Access Control-Control Element (MAC-CE) for activating or inactivating at least one of the plurality of second cells in the unlicensed band to the terminal, and the extended MAC-CE may include an indicator that indicates a format of the MAC-CE. The control unit 3020 may further operate to select one of the plurality of second cells in the unlicensed band and to transmit a cell switching signal based on the selected cell.

The control unit 3020 may operate to transmit the cell switching signal using L1 signaling in the licensed band. Further, the control unit 3020 may operate to transmit a message for configuring the plurality of second cells in the unlicensed band that is included in an RRC connection configuration message. Further, the control unit 3020 may transmit the cell switching signal that includes an indicator that indicates whether the terminal performs a data reception operation or a channel measurement operation with respect to the cell that is selected by the base station.

Further, the control unit 3020 may further operate to monitor an occupation state of a currently activated cell and an occupation state of a candidate cell and to monitor the occupation state on the basis of at least one of a CCA idle time and a duty cycle idle time in the currently activated cell and the target cell. Further, the control unit 3020 may further operate to transmit a reservation signal to the selected cell before transmitting the cell switching signal, to determine an MCS for data transmission on the basis of the result of long-term Radio Resource Management (RRM) measurement that is received from the terminal, and to transmit data on the basis of the determined MCS.

Further, the control unit 3020 may further operate to transmit a reservation signal to the selected cell after transmitting the cell switching request message, to receive the result of channel measurement based on the reservation signal from the terminal, to determine an MCS for data transmission on the basis of the result of the channel measurement, and to transmit data on the basis of the determined MCS.

Figure 31:
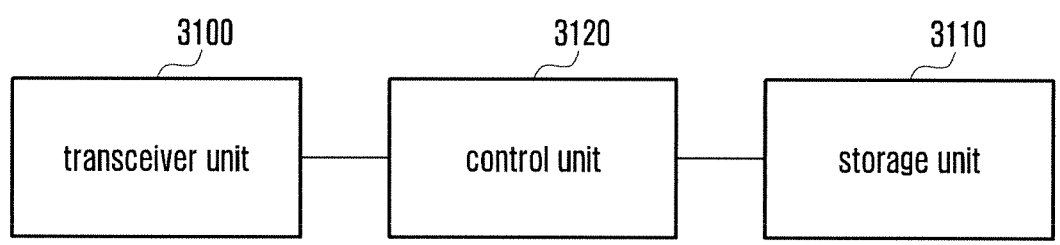
FIG. 31 is a block diagram illustrating the internal configuration of a terminal according to an embodiment of the present invention.

FIG. 31 is a block diagram illustrating the internal configuration of a terminal according to an embodiment of the present invention.

More specifically, the terminal may include a transceiver unit 3100, a storage unit 3110, and a control unit 3120.

The transceiver unit 3100 may transmit and receive information that is required for the terminal to perform an operation according to the present invention. The transceiver unit 3100 may transmit and receive signals in frequencies of a licensed band and an unlicensed band.

The storage unit 3110 may store therein information that is required for the operation of the terminal according to the present invention. The storage unit 3110 may receive information that is received from the transceiver unit 3100 from the control unit 3130, and may store the received information therein.

The control unit 3120 may operate to connect with a base station through a first cell in the licensed band, to receive a message for configuring a plurality of second cells in the unlicensed band from the base station through the first cell, and to configure the plurality of second cells in the unlicensed band. The control unit 3120 may operate to receive an extended Medium Access Control-Control Element (MAC-CE) for activating or inactivating at least one of the plurality of second cells in the unlicensed band from the base station. The extended MAC-CE may include an indicator that indicates a format of the MAC-CE.

The control unit 3120 may further operate to receive a cell switching signal for one cell that is selected by the base station among the plurality of second cells in the unlicensed band. Further, the control unit 3120 may operate to receive the cell switching signal through L1 signaling in the licensed band. The control unit 3120 may further operate to sense whether a reservation signal is received from the base station in the case where the selected cell is switched to an activated cell, to measure a channel on the basis of the reservation signal and to transmit the result of channel measurement to the base station if the reservation signal from the base station is sensed, and to receive data from the base station.

The control unit 3120 may further operate to sense whether a reservation signal is received from the base station in the case where the selected cell is switched to an activated cell, to perform long-term RRM measurement of the selected cell and to transmit the result of RRM measurement to the base station if only a part of the reservation signal from the base station is sensed, and to receive data from the base station.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

What is claimed is:

1. A method performed by a terminal in a mobile communication system, the method comprising:
receiving, from a base station, a radio resource control (RRC) message to configure a plurality of frequency bandwidths for the terminal, the RRC message including first information on a first frequency bandwidth and second information on at least one second frequency bandwidth, the first frequency bandwidth being configured to be activated at first by the RRC message;
receiving, from the base station, data on the first frequency bandwidth based on the RRC message;
receiving, from the base station, information indicating one of the at least one second frequency bandwidth on a physical downlink control channel (PDCCH);
performing frequency bandwidth switching to the one of the at least one second frequency bandwidth, based on the information and the RRC message;
receiving, from the base station, data on the one of the at least one second frequency bandwidth indicated by the information; and
returning to the first frequency bandwidth based on the first information included in the RRC message, upon an activity expiration timer for returning to the first frequency bandwidth being expired,
wherein only one of the plurality of frequency bandwidths is activated at a time.

2. The method of claim 1, further comprising:
receiving, from the base station, information on the activity expiration timer.

3. The method of claim 1,
wherein the information further includes at least one of information on a center frequency, and information on a transmission power.

4. A method performed by a base station in a mobile communication system, the method comprising:
transmitting, to a terminal, a radio resource control (RRC) message to configure a plurality of frequency bandwidths for the terminal, the RRC message including first information on a first frequency bandwidth and second information on at least one second frequency bandwidth, the first frequency bandwidth being configured to be activated at first by the RRC message;
transmitting, to the terminal, data on the first frequency bandwidth based on the RRC message;
transmitting, to the terminal, information indicating one of the at least one second frequency bandwidth on a physical downlink control channel (PDCCH), wherein frequency bandwidth switching from the first frequency bandwidth to the one of the at least one second frequency bandwidth is indicated based on the information and the RRC message;
transmitting, to the terminal, data on the one of the at least one second frequency bandwidth indicated by the information; and
performing a communication with the terminal on the first frequency bandwidth based on the first information included in the RRC message, upon an activity expiration timer for returning to the first frequency bandwidth being expired,
wherein only one of the plurality of frequency bandwidths is activated at a time.

5. The method of claim 4, further comprising:
transmitting, to the terminal, information on the activity expiration timer.

6. The method of claim 4,
wherein the information further includes at least one of information on a center frequency, and information on a transmission power.

7. A terminal in a mobile communication system, the terminal comprising:
a transceiver; and
a controller coupled with the transceiver and configured to:
control the transceiver to receive, from a base station, a radio resource control (RRC) message to configure a plurality of frequency bandwidths for the terminal, the RRC message including first information on a first frequency bandwidth and second information on at least one second frequency bandwidth, the first frequency bandwidth being configured to be activated at first by the RRC message, control the transceiver to receive, from the base station, data on the first frequency bandwidth based on the RRC message, control the transceiver to receive, from the base station, information indicating one of the at least one second frequency bandwidth on a physical downlink control channel (PDCCH), perform frequency bandwidth switching to the one of the at least one second frequency bandwidth based on the information and the RRC message, control the transceiver to receive, from the base station, data on the one of the at least one second frequency bandwidth indicated by the information; and control to return to the first frequency bandwidth based on the first information included in the RRC message, upon an activity expiration timer for returning to the first frequency bandwidth being expired, wherein only one of the plurality of frequency bandwidths is activated at a time.

8. The terminal of claim 7, wherein the controller is further configured to:

control the transceiver to receive, from the base station, information on the activity expiration timer.

9. The terminal of claim 7, wherein the information further includes at least one of information on a center frequency, and information on a transmission power.

10. A base station in a mobile communication system, the base station comprising:

a transceiver; and a controller coupled with the transceiver and configured to:

control the transceiver to transmit, to a terminal, a radio resource control (RRC) message to configure a plurality of frequency bandwidths for the terminal, the RRC message including first information on a first frequency bandwidth and second information on at least one second frequency bandwidth, the first frequency bandwidth being configured to be activated at first by the RRC message, control the transceiver to transmit, to the terminal, data on the first frequency bandwidth based on the RRC message, control the transceiver to transmit, to the terminal, information indicating one of the at least one second frequency bandwidth on a physical downlink control channel (PDCCH), wherein frequency bandwidth switching from the first frequency bandwidth to the one of the at least one second frequency bandwidth is indicated based on the information and the RRC message, control the transceiver to transmit, to the terminal, data on the one of the at least one second frequency bandwidth indicated by the information, and perform a communication with the terminal on the first frequency bandwidth based on the first information included in the RRC message, upon an activity expiration timer for returning to the first frequency bandwidth being expired, wherein only one of the plurality of frequency bandwidths is activated at a time.

11. The base station of claim 10, wherein the controller is further configured to:

control the transceiver to transmit, to the terminal, information on the activity expiration timer.

12. The base station of claim 10, wherein the information further includes at least one of information on a center frequency, and information on a transmission power.

* * * * *